(12) United States Patent
Hsu et al.

(10) Patent No.: US 11,490,561 B2
(45) Date of Patent: Nov. 8, 2022

(54) DUAL ROTOR SPREADER SYSTEM

(71) Applicant: OMS Investments, Inc., Los Angeles, CA (US)

(72) Inventors: Paul E. Hsu, Lewis Center, OH (US); Ryan R. Berger, Columbus, OH (US); Daniel Wisniewski, Columbus, OH (US); Johannes Hertrich, Columbus, OH (US); John Knittle, Westerville, OH (US); Eric Glassner, Hilliard, OH (US)

(73) Assignee: OMS Investments, Inc., Los Angeles, CA (US)

( * ) Notice: Subject to any disclaimer, the term of this patent is extended or adjusted under 35 U.S.C. 154(b) by 591 days.

(21) Appl. No.: 16/488,004

(22) PCT Filed: Feb. 23, 2018

(86) PCT No.: PCT/US2018/019528
§ 371 (c)(1),
(2) Date: Aug. 22, 2019

(87) PCT Pub. No.: WO2018/156958
PCT Pub. Date: Aug. 30, 2018

(65) Prior Publication Data
US 2020/0053956 A1     Feb. 20, 2020

Related U.S. Application Data

(60) Provisional application No. 62/462,794, filed on Feb. 23, 2017.

(51) Int. Cl.
*A01C 17/00* (2006.01)
*E01H 10/00* (2006.01)
*A01M 9/00* (2006.01)

(52) U.S. Cl.
CPC .......... *A01C 17/001* (2013.01); *A01C 17/005* (2013.01); *A01M 9/0061* (2013.01); *E01H 10/007* (2013.01)

(58) Field of Classification Search
CPC ... A01C 15/006; A01C 15/007; A01C 15/008; A01C 15/02; A01C 17/001;
(Continued)

(56) References Cited

U.S. PATENT DOCUMENTS

| | | |
|---|---|---|
| 2,594,084 A | 4/1952 | Skibbe et al. |
| 3,383,055 A | 5/1968 | Speicher |

(Continued)

FOREIGN PATENT DOCUMENTS

| | | |
|---|---|---|
| BE | 394975 A | 3/1933 |
| DE | 202013002363 U1 | 6/2013 |

(Continued)

OTHER PUBLICATIONS

International Search Report and Written Opinion of the International Searching Authority for Application No. PCT/US2018/019528 dated May 17, 2018 (11 pages).

*Primary Examiner* — Darren W Gorman
(74) *Attorney, Agent, or Firm* — Ulmer & Berne LLP

(57) ABSTRACT

A spreader for broadcasting granular or particulate material over a surface includes a dual rotor configuration, a material deflection system, and a portable electronic device holder. The material deflection system includes components for deflecting material broadcasted by each of the rotors. The spreader includes a walking speed indicator to inform the user whether the current speed is too fast, too slow, or within an acceptable reference range.

21 Claims, 32 Drawing Sheets

(58) Field of Classification Search
CPC ... A01C 17/005; A01C 17/006; A01C 17/008; A01M 9/0061; E01H 10/007; E01C 19/203; E01C 19/2035; E01C 2019/2055; E01C 2019/206; E01C 2019/2065
See application file for complete search history.

(56) References Cited

U.S. PATENT DOCUMENTS

| | | | |
|---|---|---|---|
| 4,032,074 A | 6/1977 | Amerine | |
| 4,180,184 A | 12/1979 | Florer et al. | |
| 5,040,711 A | 8/1991 | Niederhauser et al. | |
| 5,203,510 A | 4/1993 | Courtney et al. | |
| D338,894 S | 8/1993 | Simpson | |
| D359,963 S | 7/1995 | Pink et al. | |
| D371,780 S | 7/1996 | Havlovitz | |
| D373,367 S | 9/1996 | Havlovitz | |
| 5,570,814 A | 11/1996 | Havlovitz | |
| D376,155 S | 12/1996 | Havlovitz | |
| D384,679 S | 10/1997 | Havlovitz | |
| 5,842,648 A | 12/1998 | Havlovitz et al. | |
| D413,903 S | 9/1999 | Spear | |
| D413,904 S | 9/1999 | Spear | |
| D414,783 S | 10/1999 | Spear | |
| 6,138,927 A | 10/2000 | Spear et al. | |
| 6,616,074 B2 | 9/2003 | Courtney et al. | |
| D602,045 S | 10/2009 | Choi et al. | |
| D602,046 S | 10/2009 | Choi et al. | |
| D610,590 S | 2/2010 | Choi et al. | |
| D610,591 S | 2/2010 | Choi et al. | |
| D623,667 S | 9/2010 | Cichy et al. | |
| 8,757,519 B2 | 6/2014 | Cichy et al. | |
| D718,792 S | 12/2014 | Lapham | |
| D829,773 S | 10/2018 | Stewart et al. | |
| D853,446 S | 7/2019 | Horeth et al. | |
| D860,261 S | 9/2019 | Hsu et al. | |
| D873,865 S | 1/2020 | Campbell et al. | |
| D875,789 S | 2/2020 | Shobe | |
| D909,421 S | 2/2021 | Hsu et al. | |
| 2002/0014545 A1 | 2/2002 | Woodruff et al. | |
| 2002/0129883 A1 | 9/2002 | O'Coin | |
| 2002/0162907 A1 | 11/2002 | Courtney et al. | |
| 2003/0057303 A1* | 3/2003 | Thompson | A01C 17/001 239/665 |
| 2003/0192968 A1 | 10/2003 | Courtney et al. | |
| 2005/0258284 A1 | 11/2005 | Magnusson | |
| 2006/0157518 A1 | 7/2006 | Havlovitz et al. | |
| 2007/0244605 A1 | 10/2007 | Hopkins | |
| 2008/0078850 A1 | 4/2008 | Bowsher | |
| 2011/0297763 A1 | 12/2011 | Kressy et al. | |
| 2013/0105592 A1 | 5/2013 | Kendall et al. | |
| 2014/0263484 A1 | 9/2014 | Marconi | |
| 2015/0136880 A1 | 5/2015 | Cichy et al. | |
| 2016/0106028 A1 | 4/2016 | Kendall et al. | |
| 2016/0316615 A1 | 11/2016 | Papke | |
| 2018/0169681 A1* | 6/2018 | Stewart | A01C 15/02 |

FOREIGN PATENT DOCUMENTS

| | | |
|---|---|---|
| JP | H01155317 U | 10/1989 |
| JP | H0248201 A | 2/1990 |
| JP | 2014187957 A | 10/2014 |
| JP | 2016508832 A | 3/2016 |
| WO | 2009137123 A1 | 11/2009 |
| WO | 2014137727 A1 | 9/2014 |

* cited by examiner

DUAL ROTOR SPREADER SYSTEM

CROSS REFERENCE TO RELATED APPLICATION

This application is a national stage application under 35 U.S.C. § 371 of International Application No. PCT/US18/19528, filed Feb. 23, 2018, which claims the benefit of U.S. Provisional Patent Application No. 62/462,794, filed on Feb. 23, 2017, the disclosures of which are hereby incorporated herein by reference in their entireties.

FIELD OF THE DISCLOSURE

The systems and methods described herein relate to spreader devices which are used in the consumer, professional or industrial markets, for example, to distribute granular product over terrain or other surfaces.

BACKGROUND

Conventionally, consumers apply granular lawn care product and other granular items to their property by using conventional spreaders. These conventional product spreaders have a single rotor for distribution of the product, which limits the distribution pattern, rate, and amount of material the spreader can distribute. Further, such single rotor spreaders have deficiencies with respect to distribution pattern given the fact that the single rotor only rotates in one direction.

Typically, conventional spreaders have an application rate adjustment mechanism that the consumer must set correctly before applying the granular product to the surface to be treated (e.g., lawn, driveway, walkway, parking lot, etc.). The adjustment settings are found on the material packaging, typically. However, this is only one setting for proper distribution of the product and this setting throttles the flow rate of product exiting the hopper of the spreader. Accordingly, there is still a continual need for improved mechanisms to control the application rate of spreaders.

Figure 1:
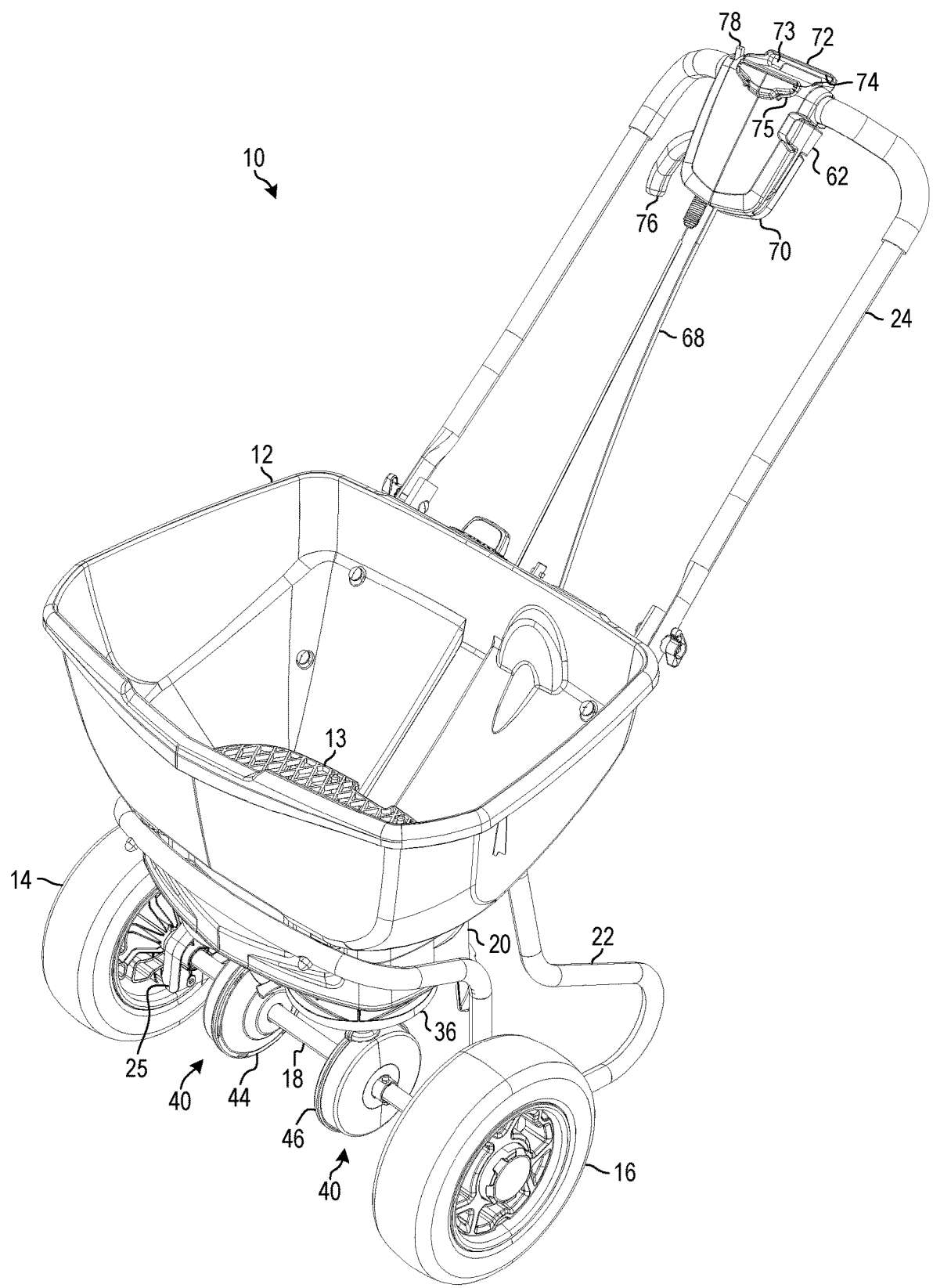
FIG. 1 is a perspective view of a spreader according to one or more illustrative embodiments.
Figure 2:
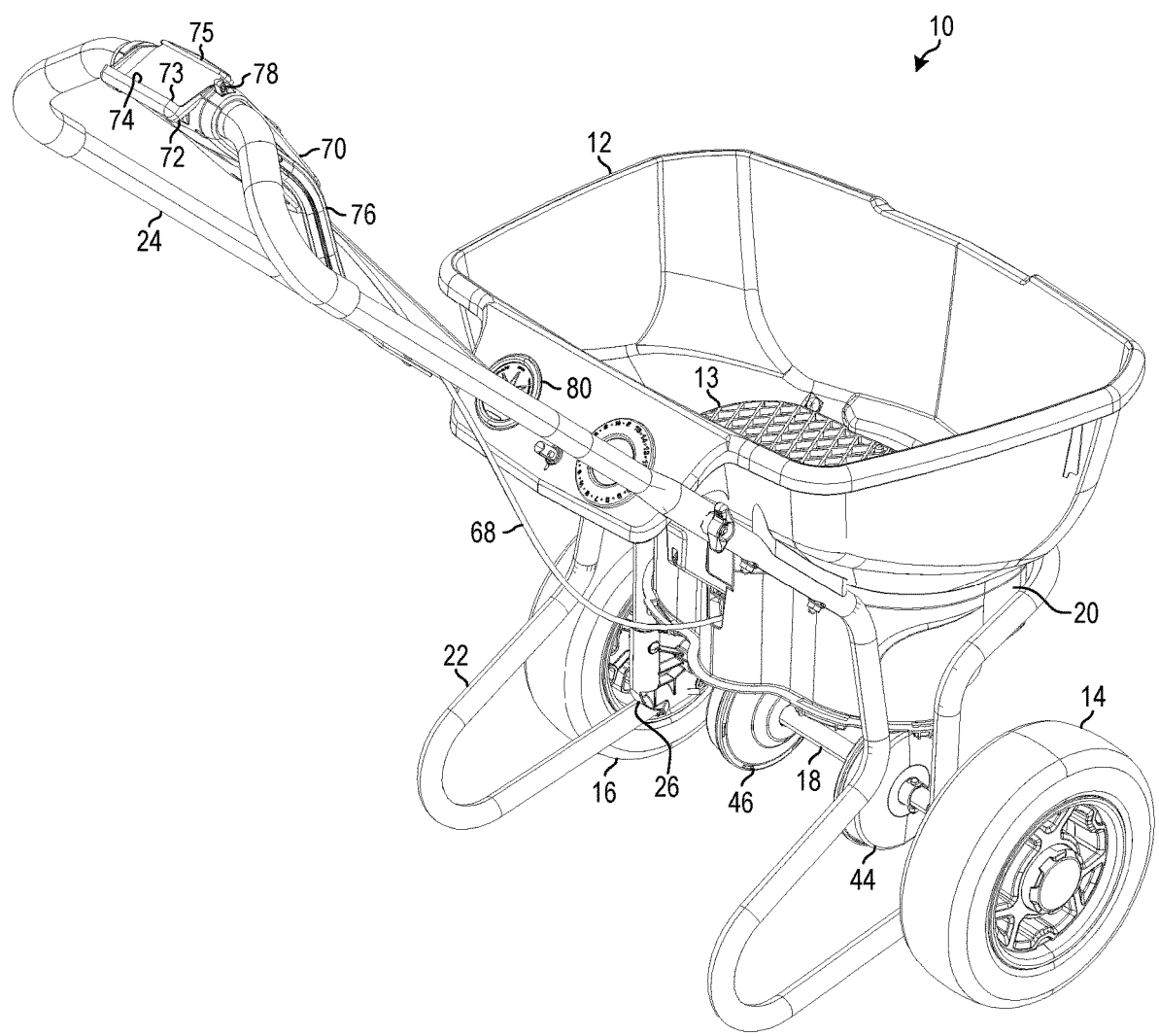
FIG. 2 is a rear perspective view of the spreader of FIG. 1.
Figure 3:
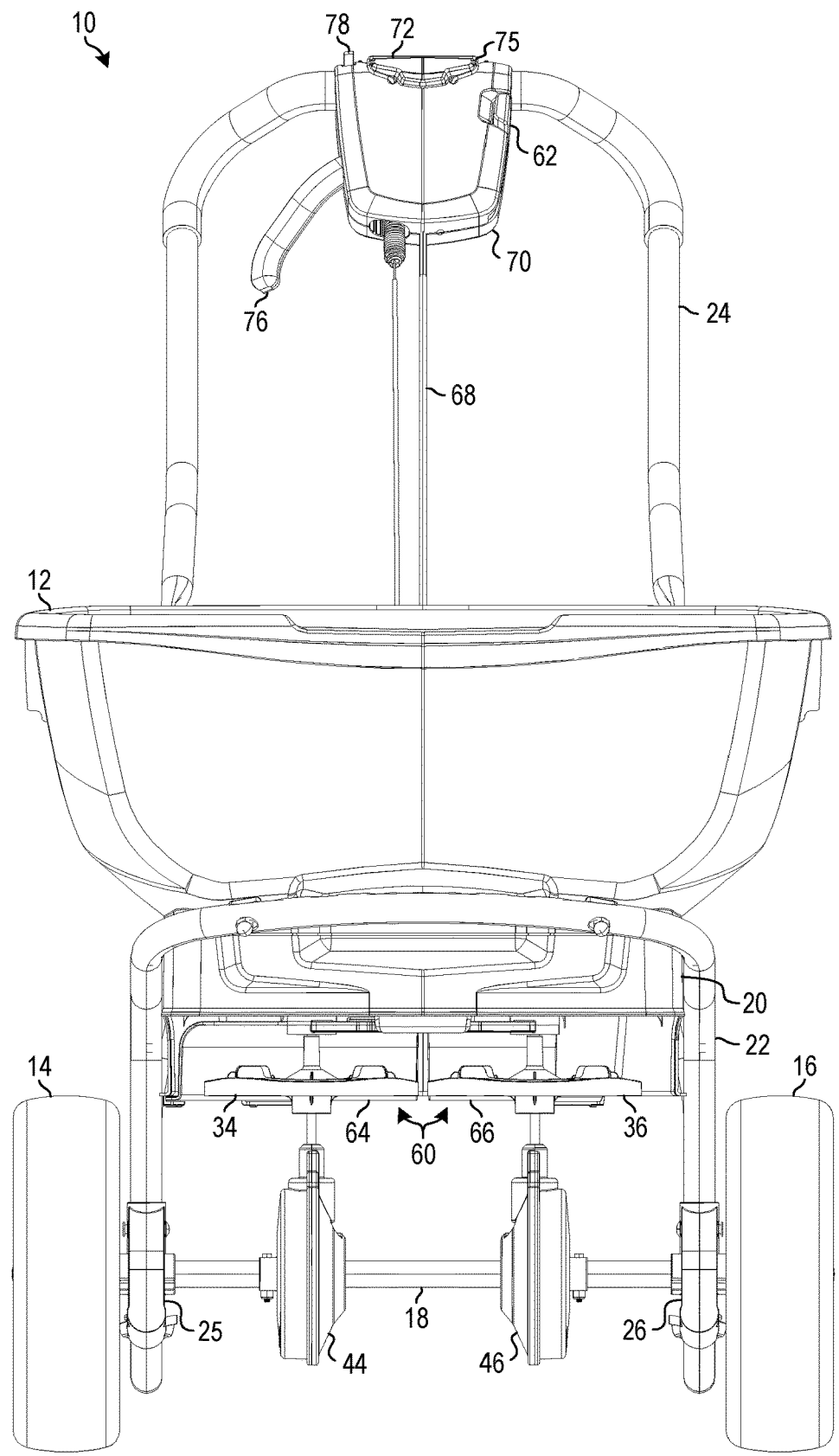
FIG. 3 is a front elevation view of the spreader of FIG. 1.
Figure 4:
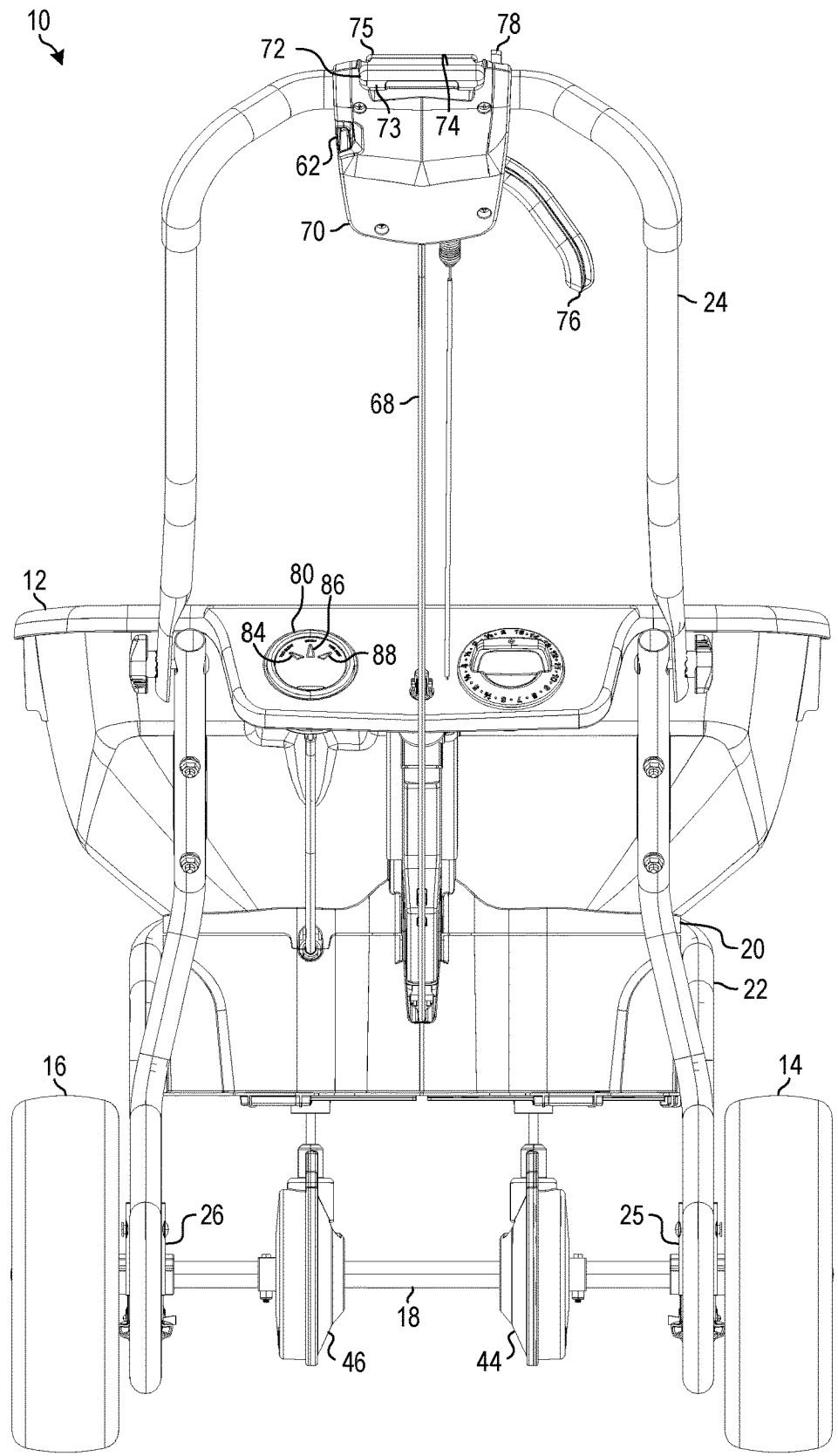
FIG. 4 is a rear elevation view of the spreader of FIG. 1.
Figure 5:
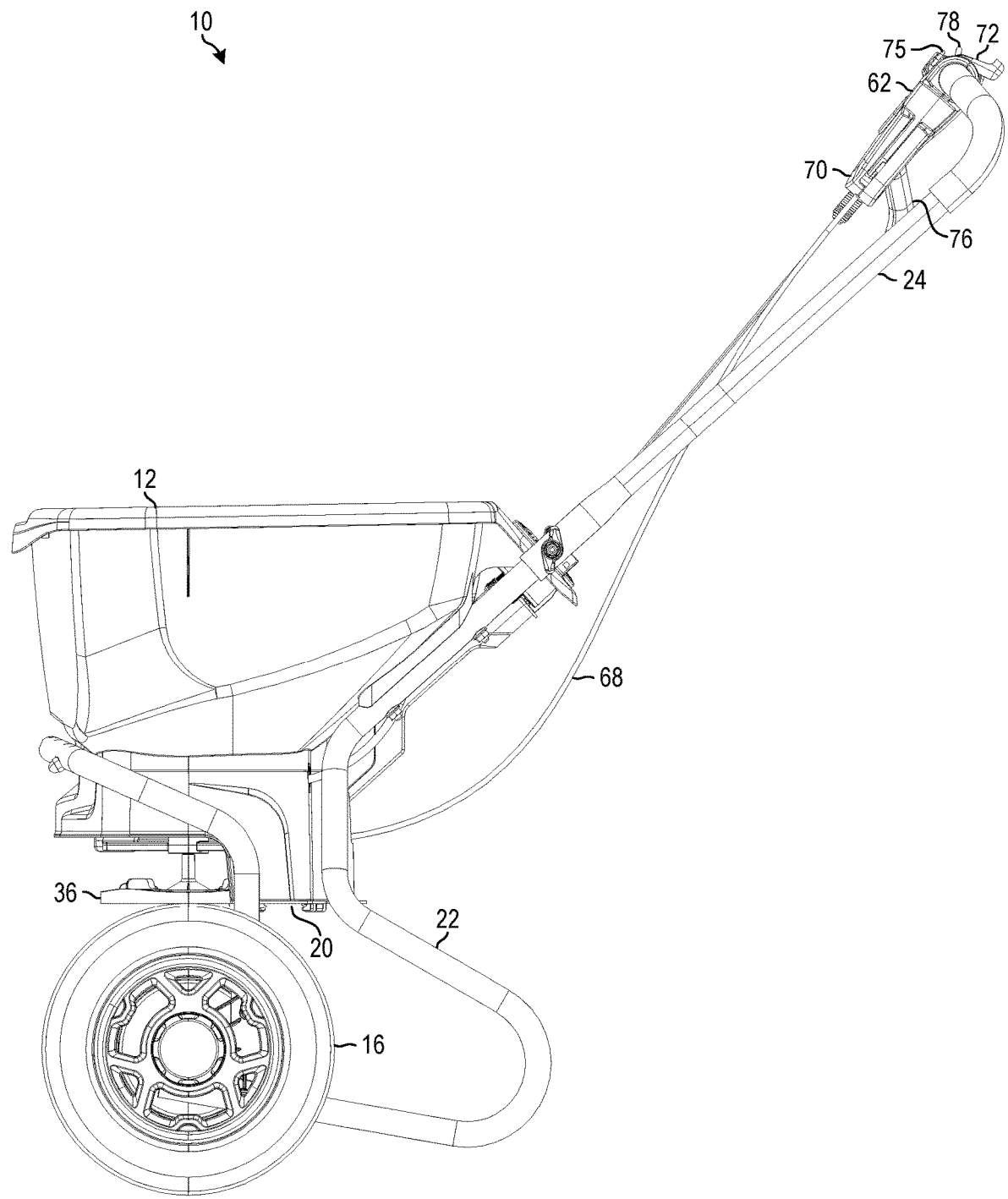
FIG. 5 is a right elevation view of the spreader of FIG. 1.
Figure 6:
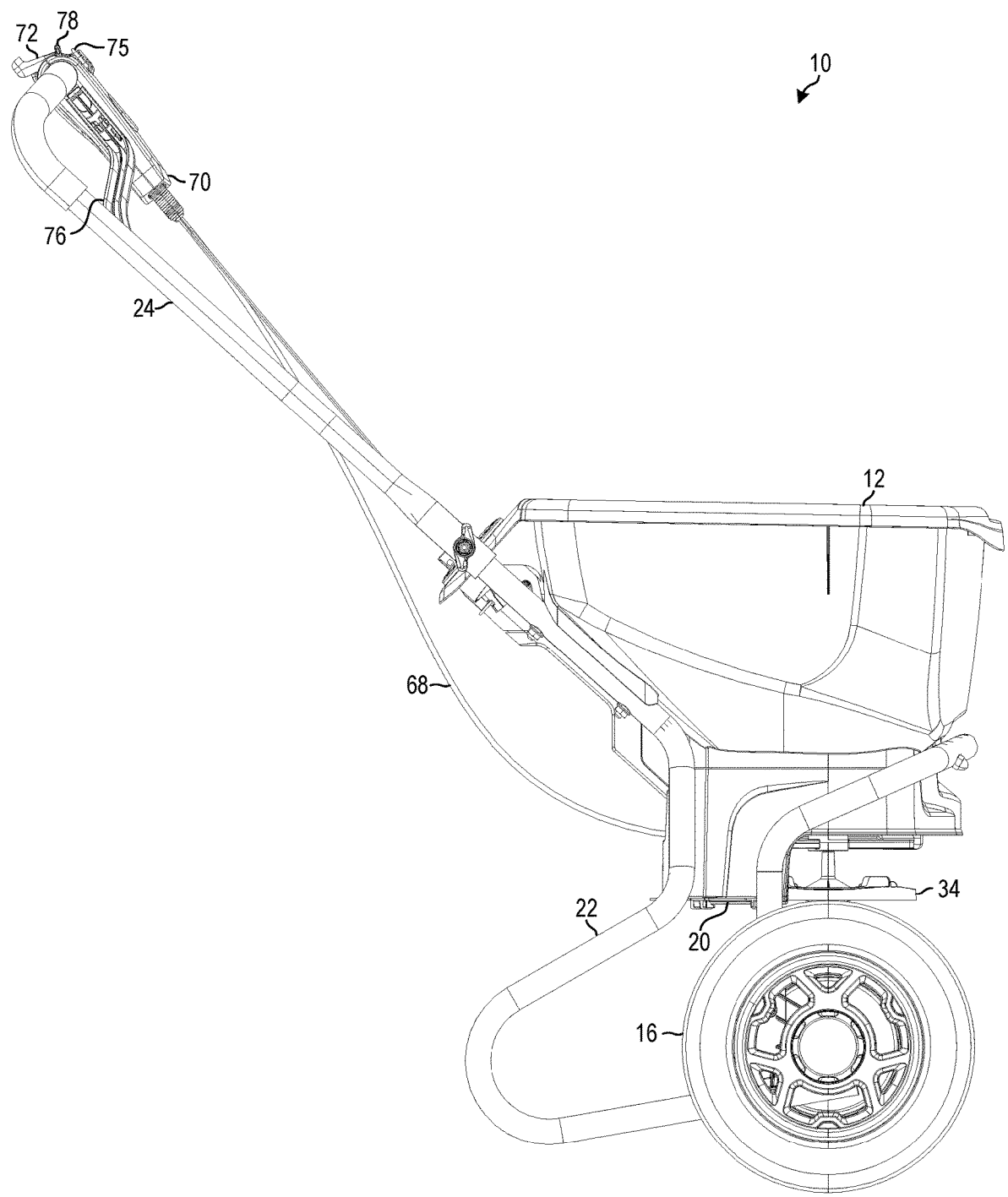
FIG. 6 is a left elevation view of the spreader of FIG. 1.
Figure 7:
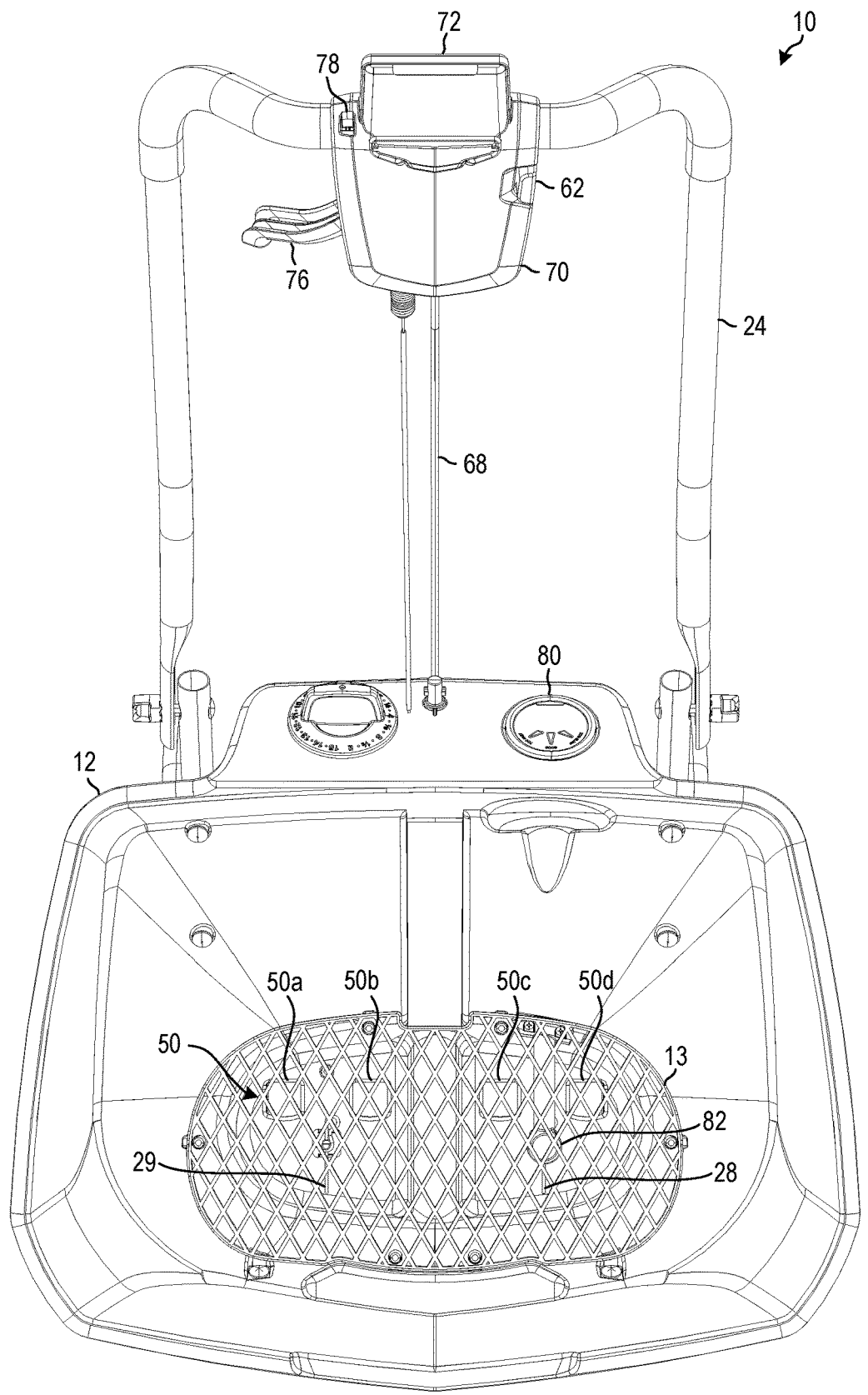
FIG. 7 is a top plan view of the spreader of FIG. 1.
Figure 8:
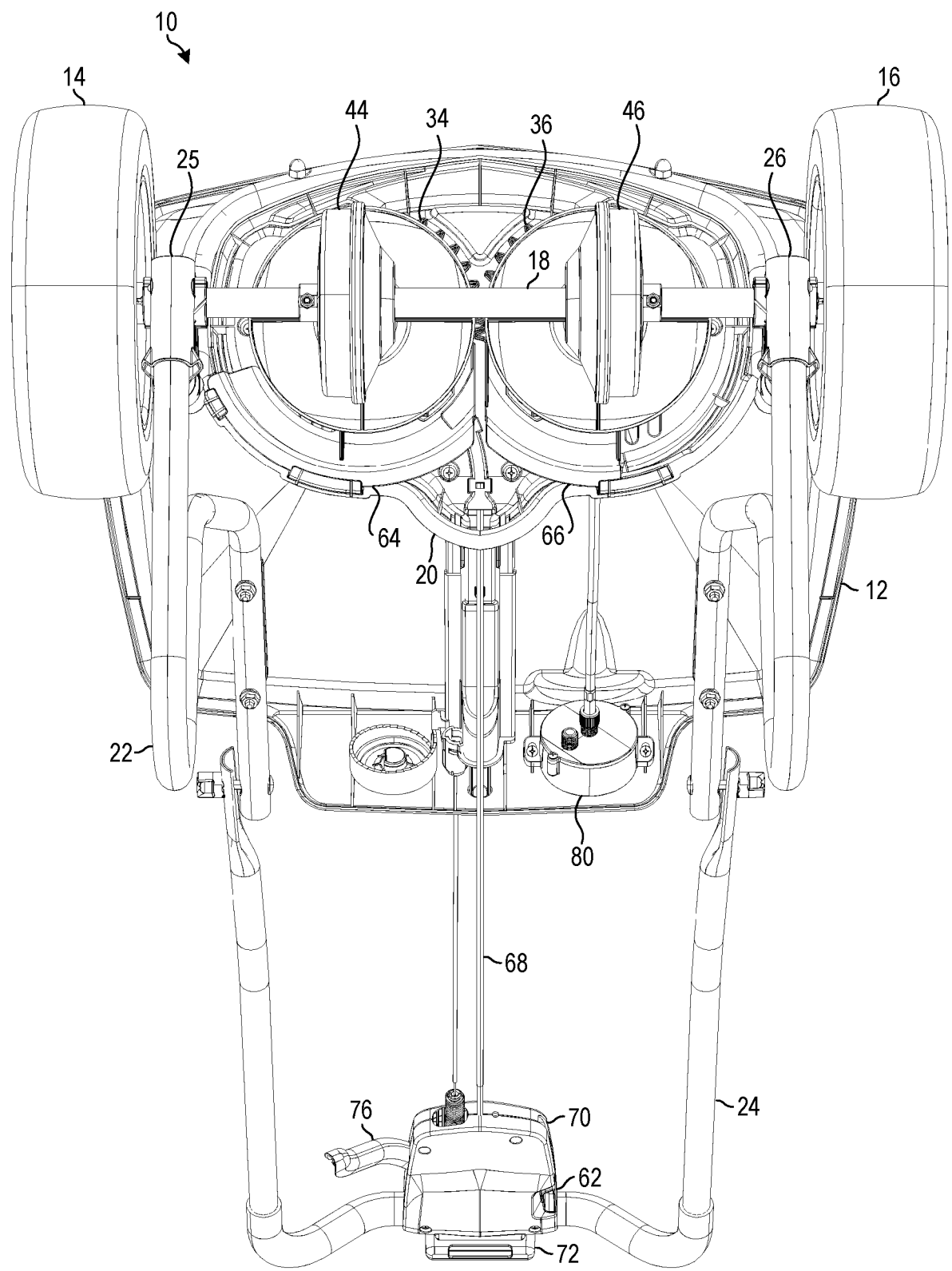
FIG. 8 is a bottom plan view of the spreader of FIG. 1.
Figure 9:
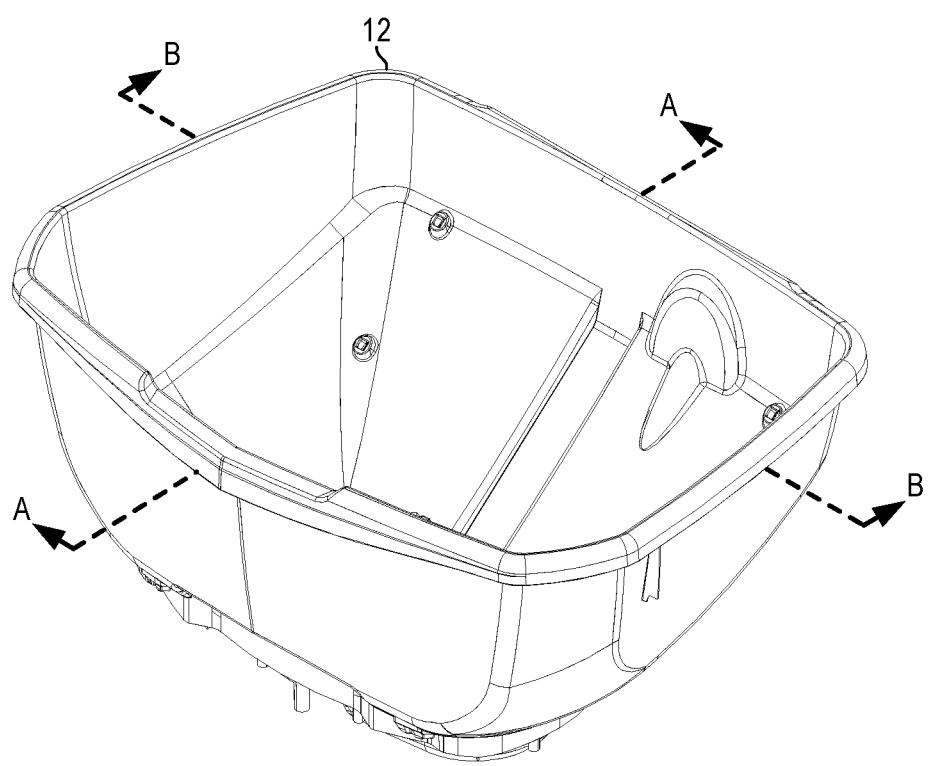
FIG. 9 is an isolated perspective view of a hopper of the spreader of FIG. 1.
Figure 10:
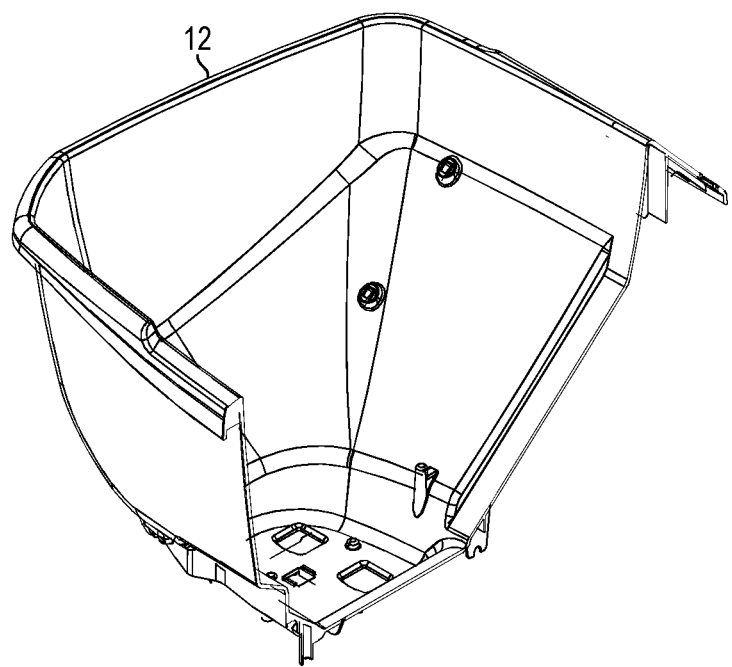
FIG. 10 is an isolated cross-sectional view taken along A-A of the illustrative hopper of FIG. 9.
Figure 11:
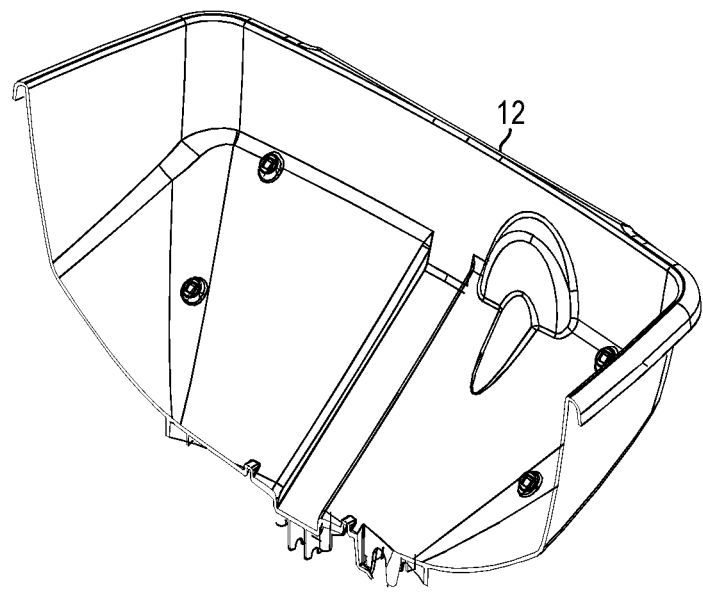
FIG. 11 is another isolated cross-sectional view taken along B-B of the illustrative hopper of FIG. 9.
Figure 12:
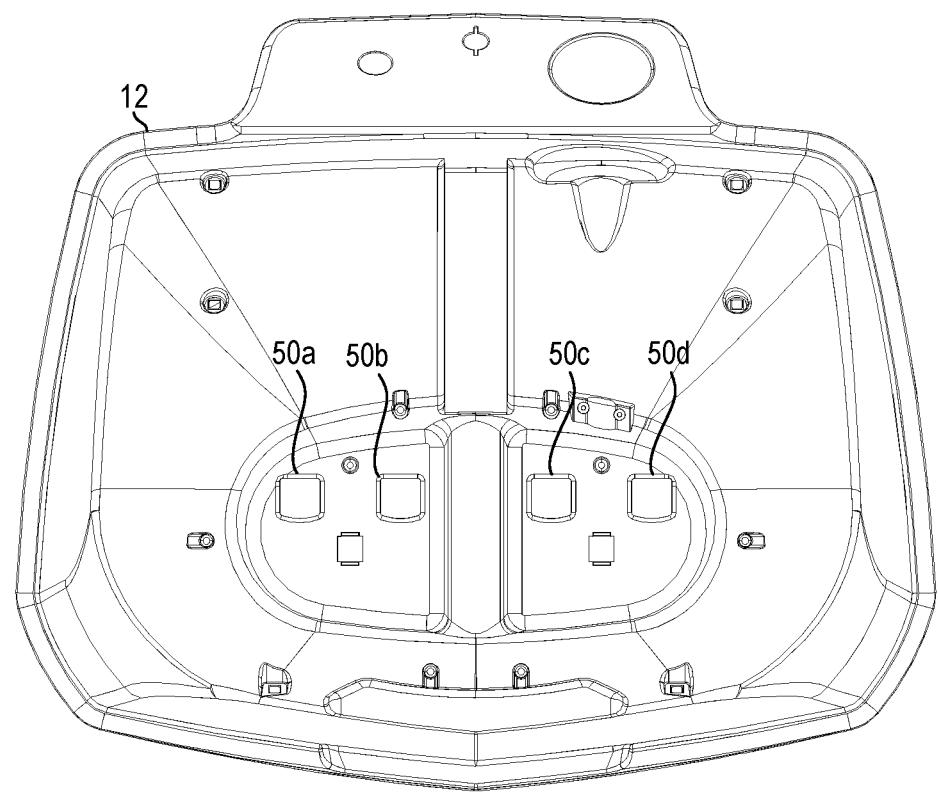
FIG. 12 is an isolated top plan view of the illustrative hopper of FIG. 9.
Figure 13:
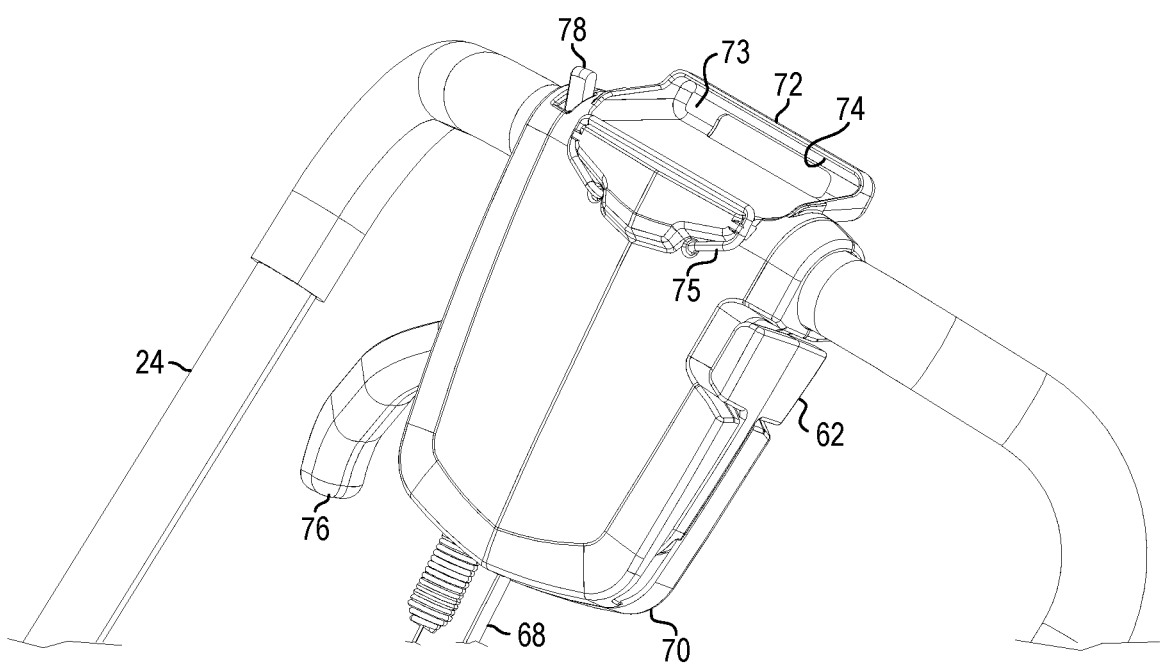
FIG. 13 is a detailed perspective view of the control assembly of the spreader of FIG. 1.
Figure 14:
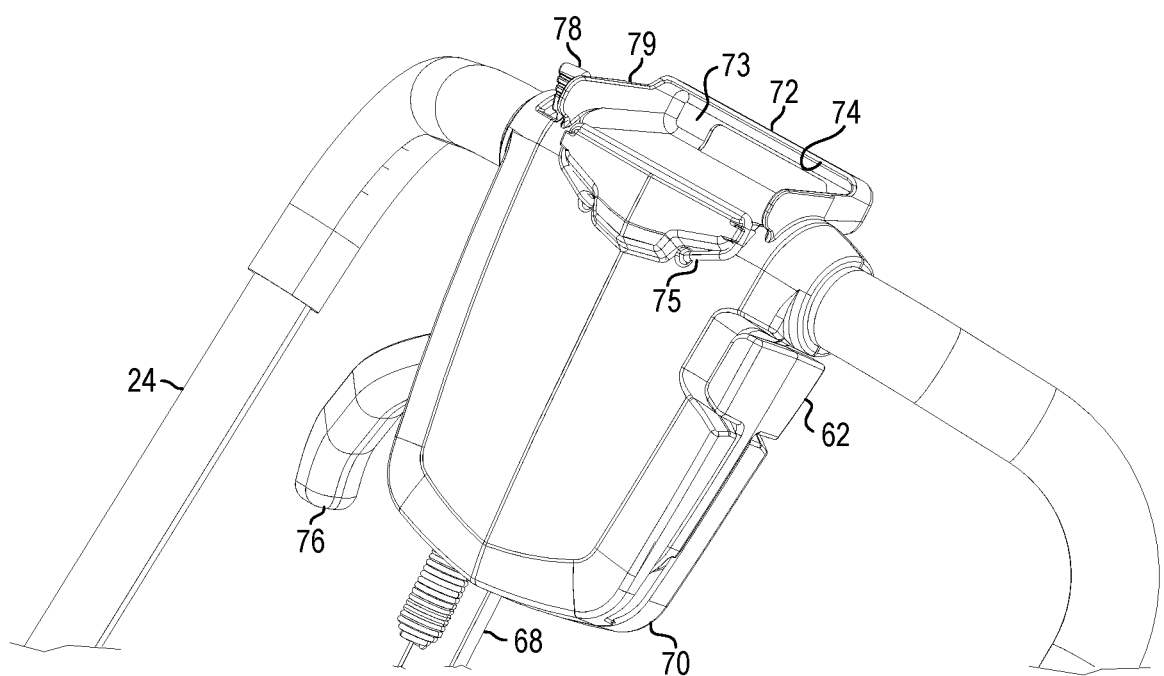
FIG. 14 is a detailed perspective view of an alternative control assembly of the spreader of FIG. 1.
Figure 15:
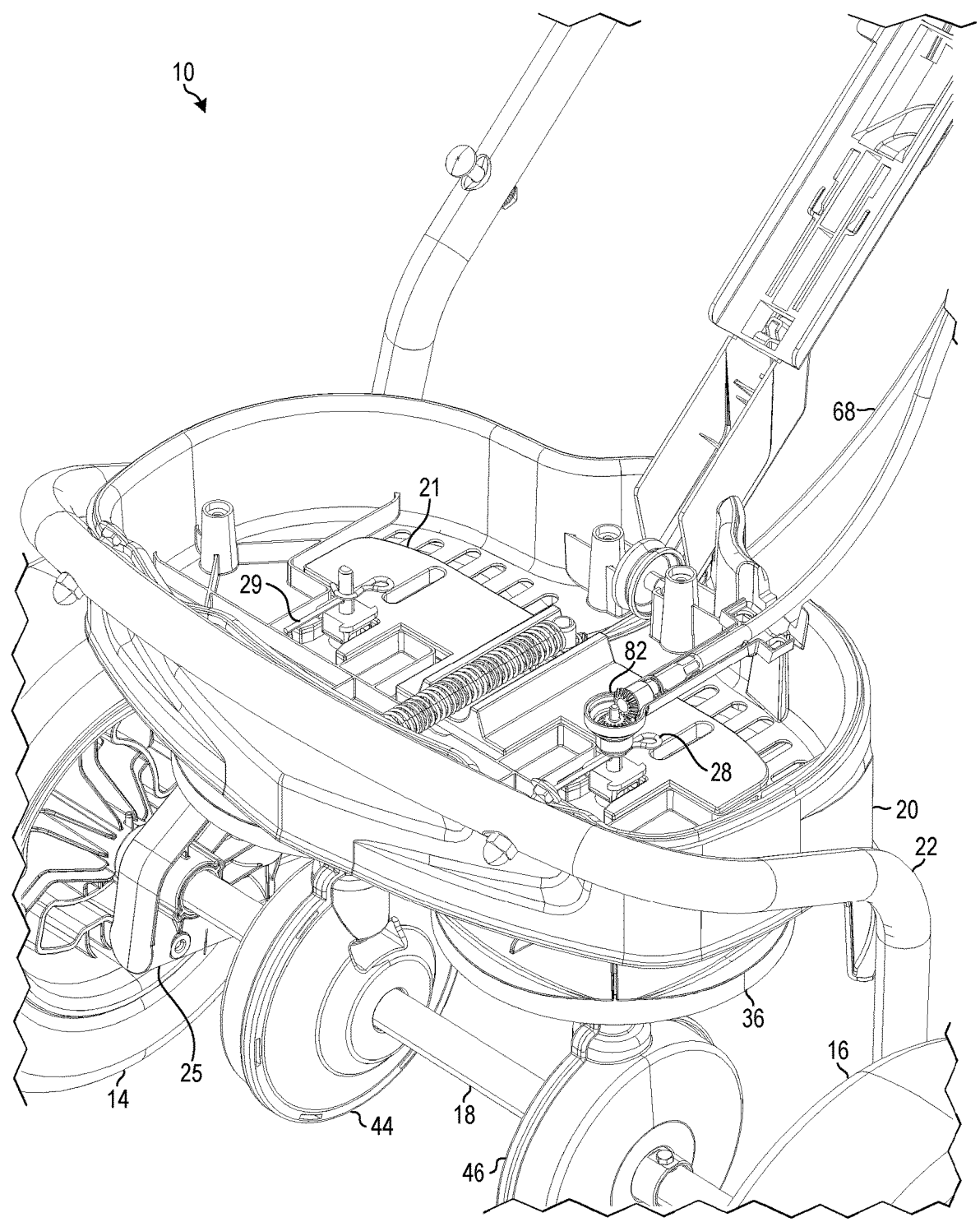
FIG. 15 is a detailed perspective view of various components of the spreader of FIG. 1 without the hopper.
Figure 16:
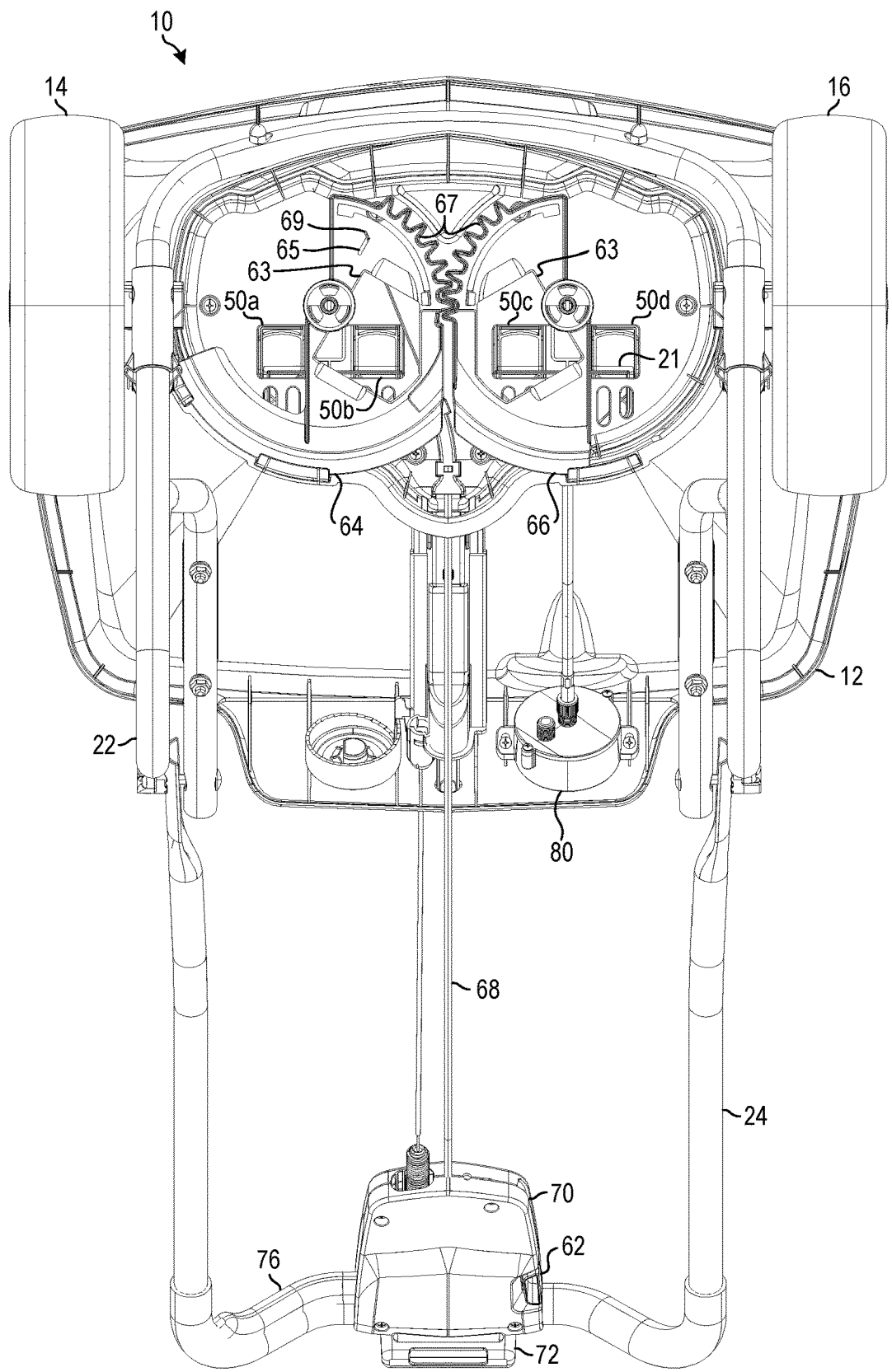
FIG. 16 is a bottom plan view of various material deflecting components of the spreader of FIG. 1 in a disengaged state.
Figure 17:
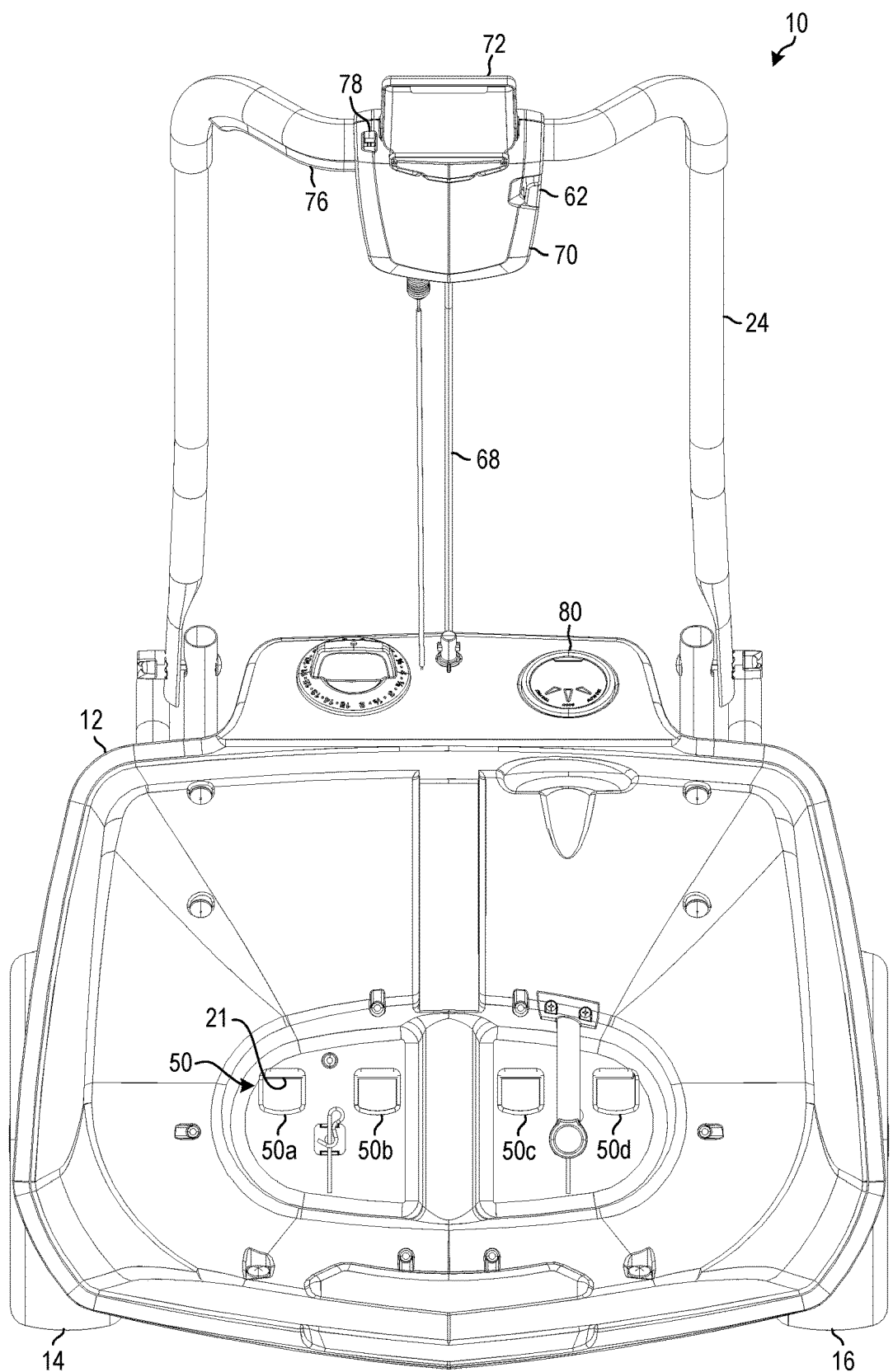
FIG. 17 is a top plan view of various material deflecting components of the spreader of FIG. 1 in the disengaged state.
Figure 18:
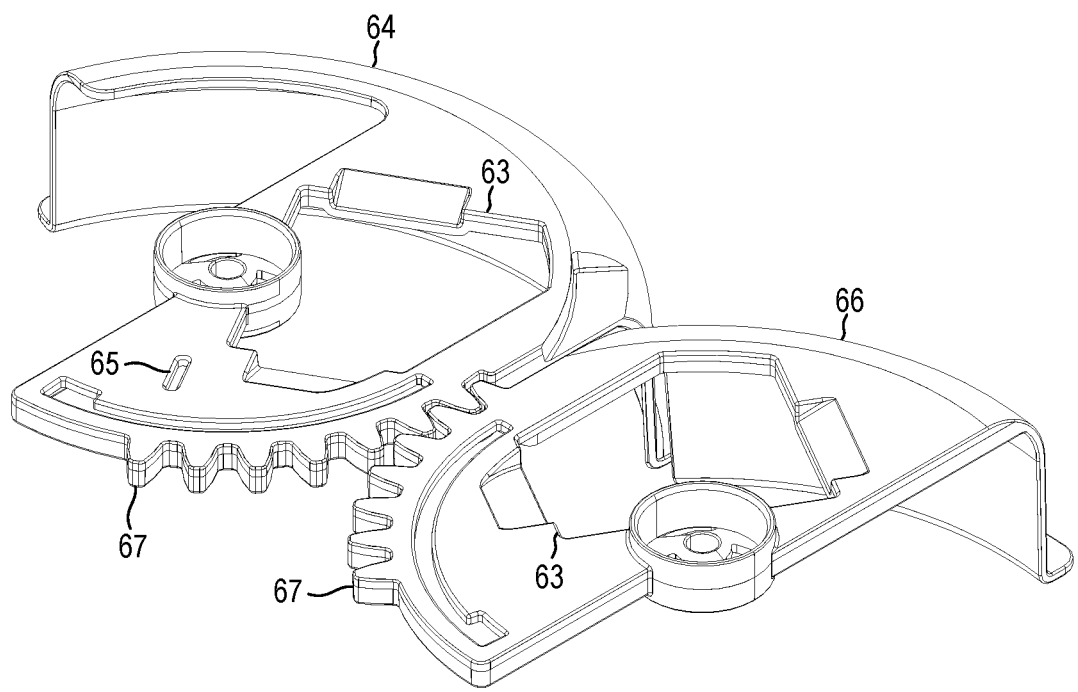
FIG. 18 is a detailed perspective view of various material deflecting components of the spreader of FIG. 1.
Figure 19:
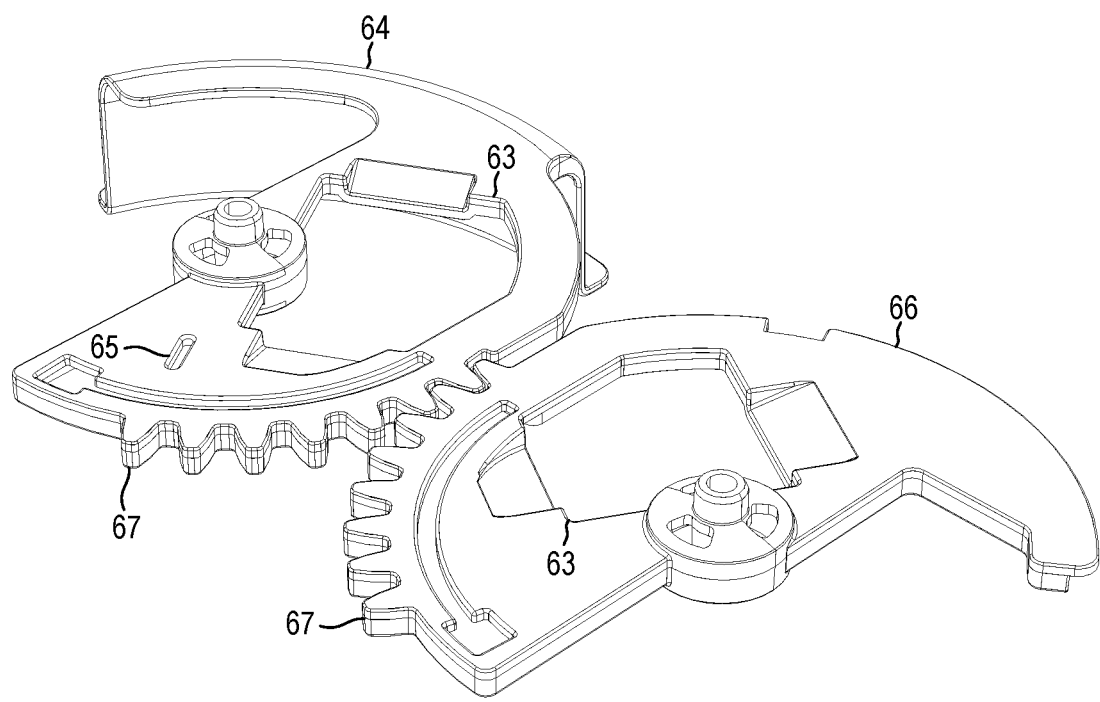
FIG. 19 is a detailed perspective view of various alternative material deflecting components of the spreader of FIG. 1.
Figure 20:
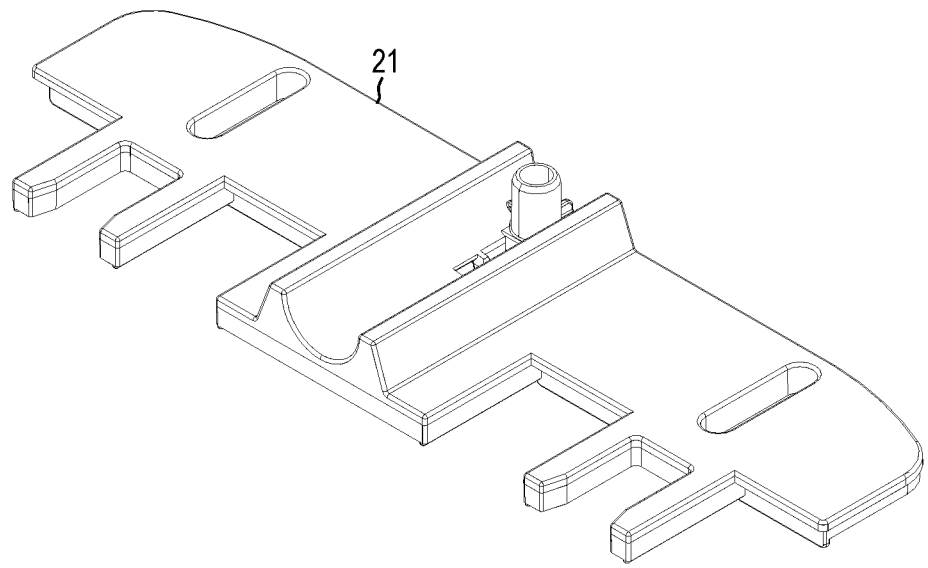
FIG. 20 is a detailed perspective view of a shutter of the spreader of FIG. 1.
Figure 21:
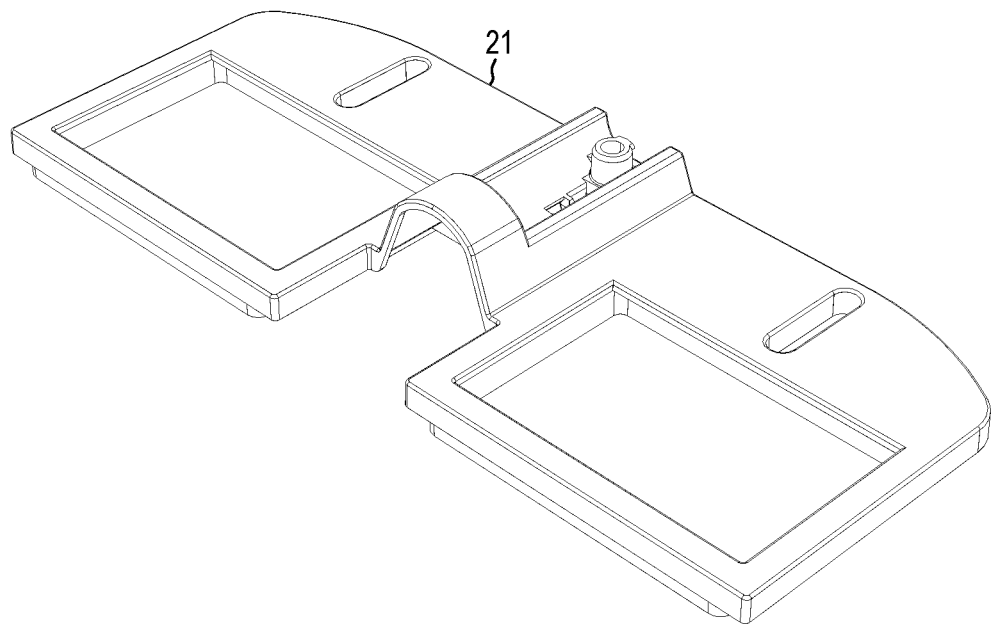
FIG. 21 is a detailed perspective view of an alternative shutter of the spreader of FIG. 1.
Figure 22:
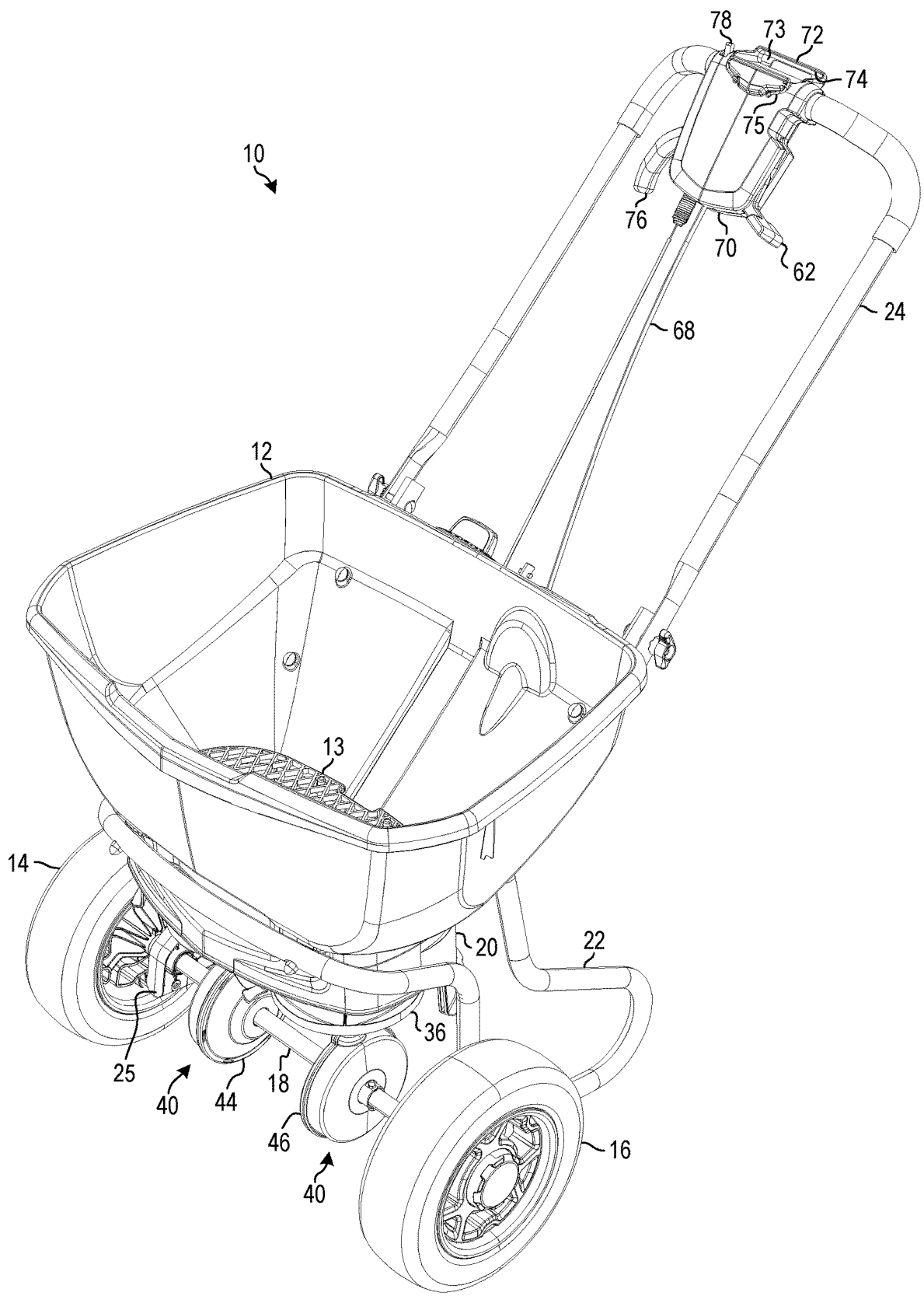
FIG. 22 is a perspective view of various material deflecting components of the spreader of FIG. 1 in an engaged state.
Figure 23:
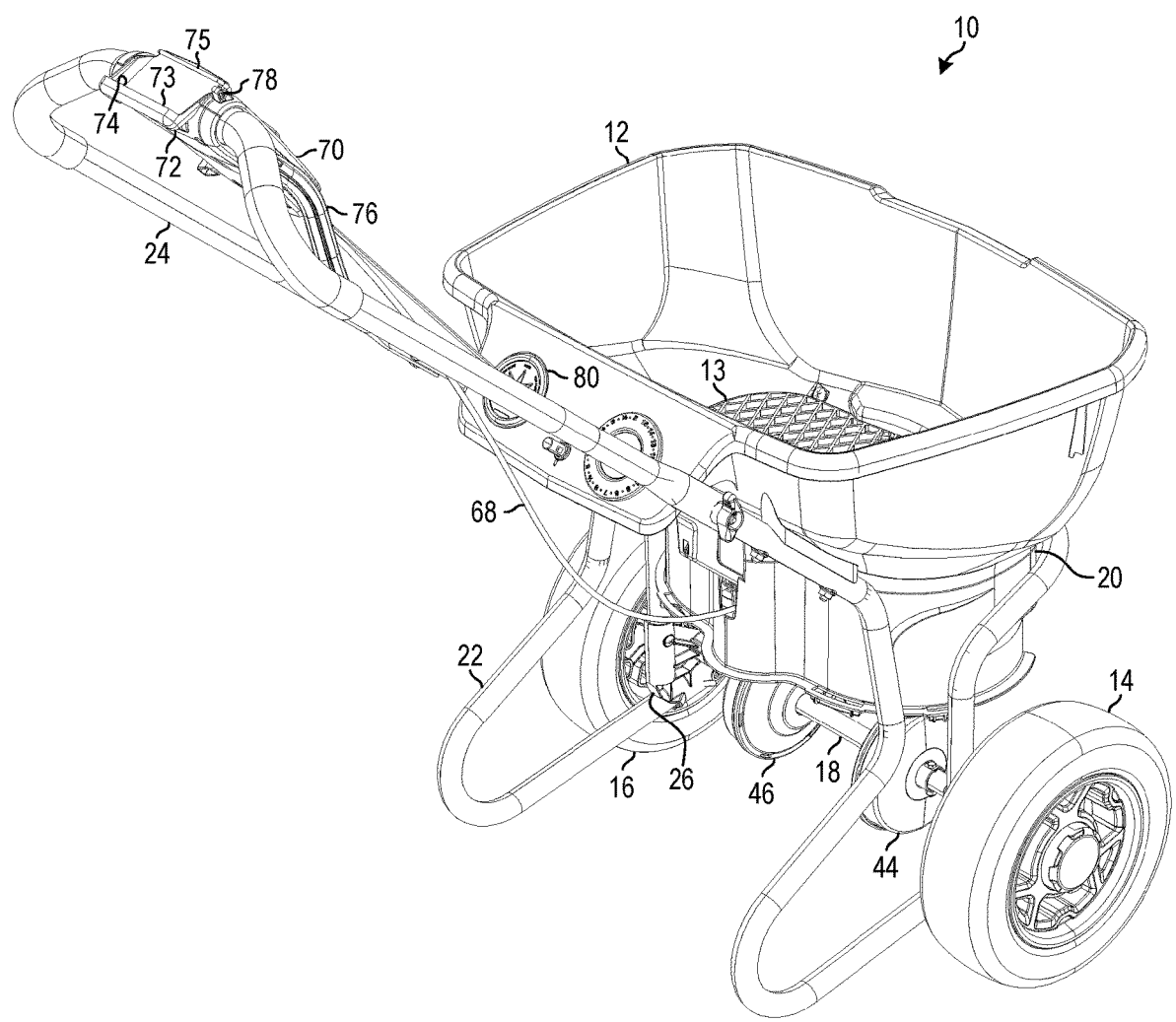
FIG. 23 is a rear perspective view of various material deflecting components of the spreader illustratively shown in FIG. 22 in the engaged state.
Figure 24:
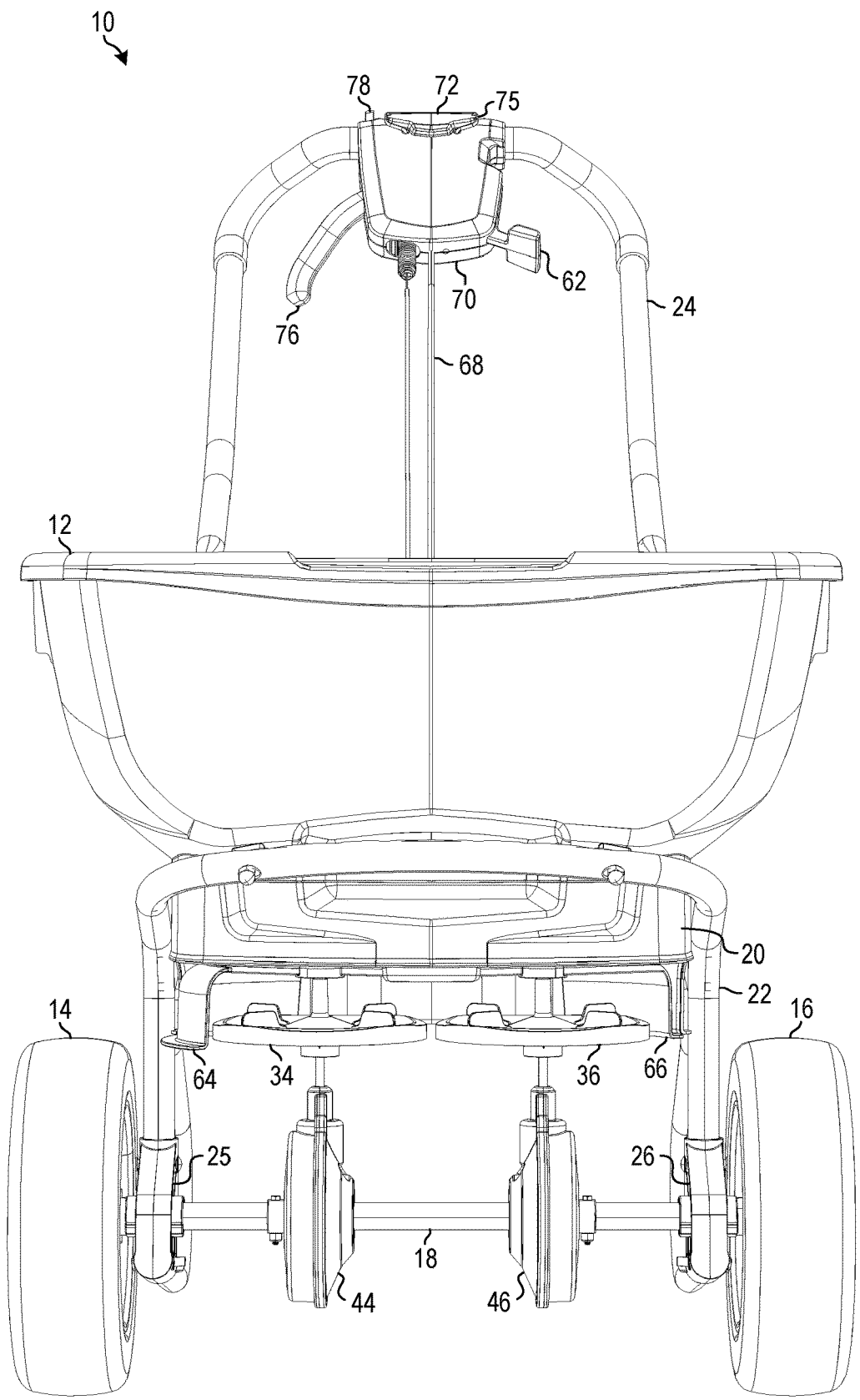
FIG. 24 is a front elevation view of various material deflecting components of the spreader illustratively shown in FIG. 22 in the engaged state.
Figure 25:
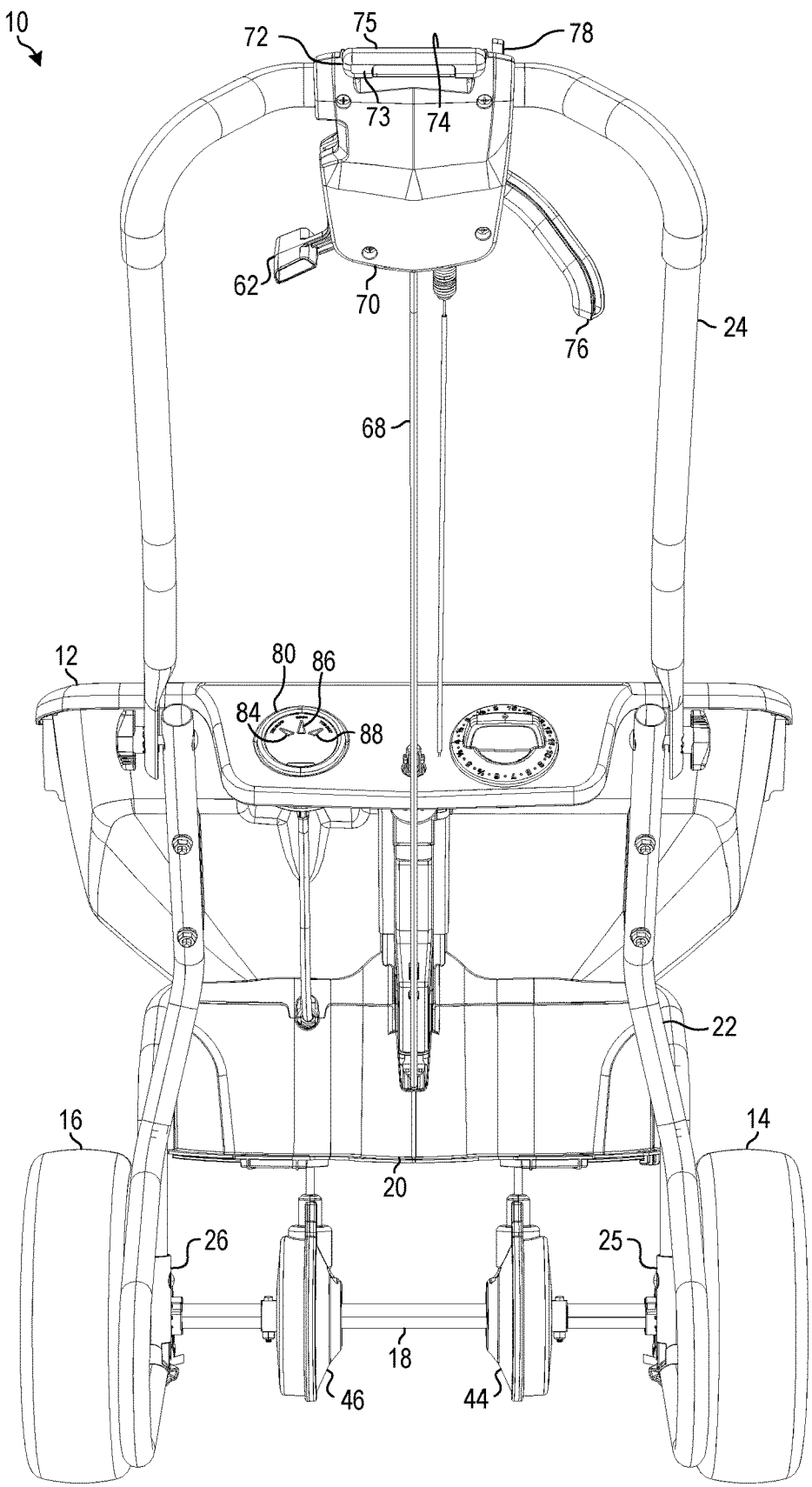
FIG. 25 is a rear elevation view of various material deflecting components of the spreader illustratively shown in FIG. 22 in the engaged state.
Figure 26:
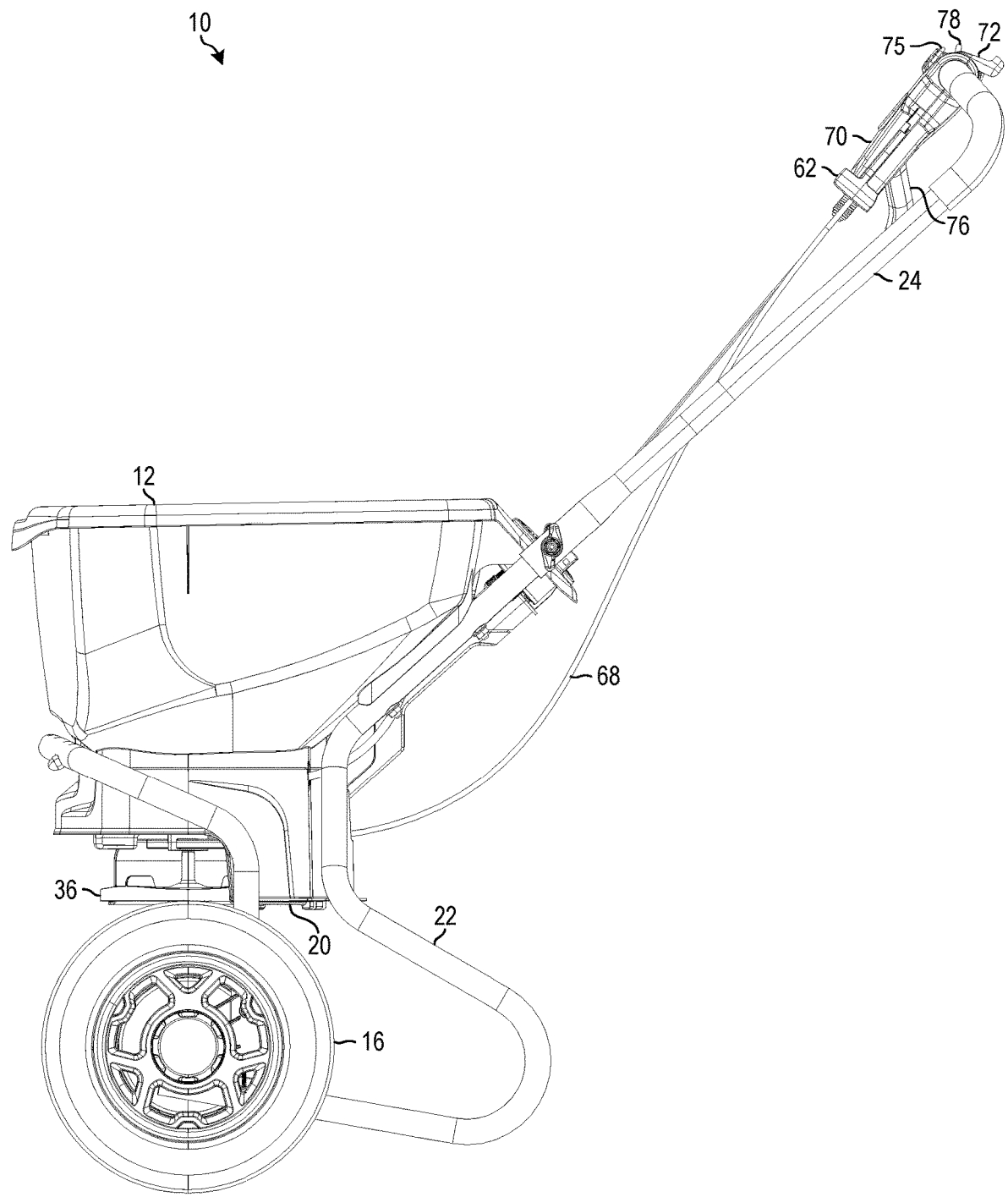
FIG. 26 is a right elevation view of various material deflecting components of the spreader illustratively shown in FIG. 22 in the engaged state.
Figure 27:
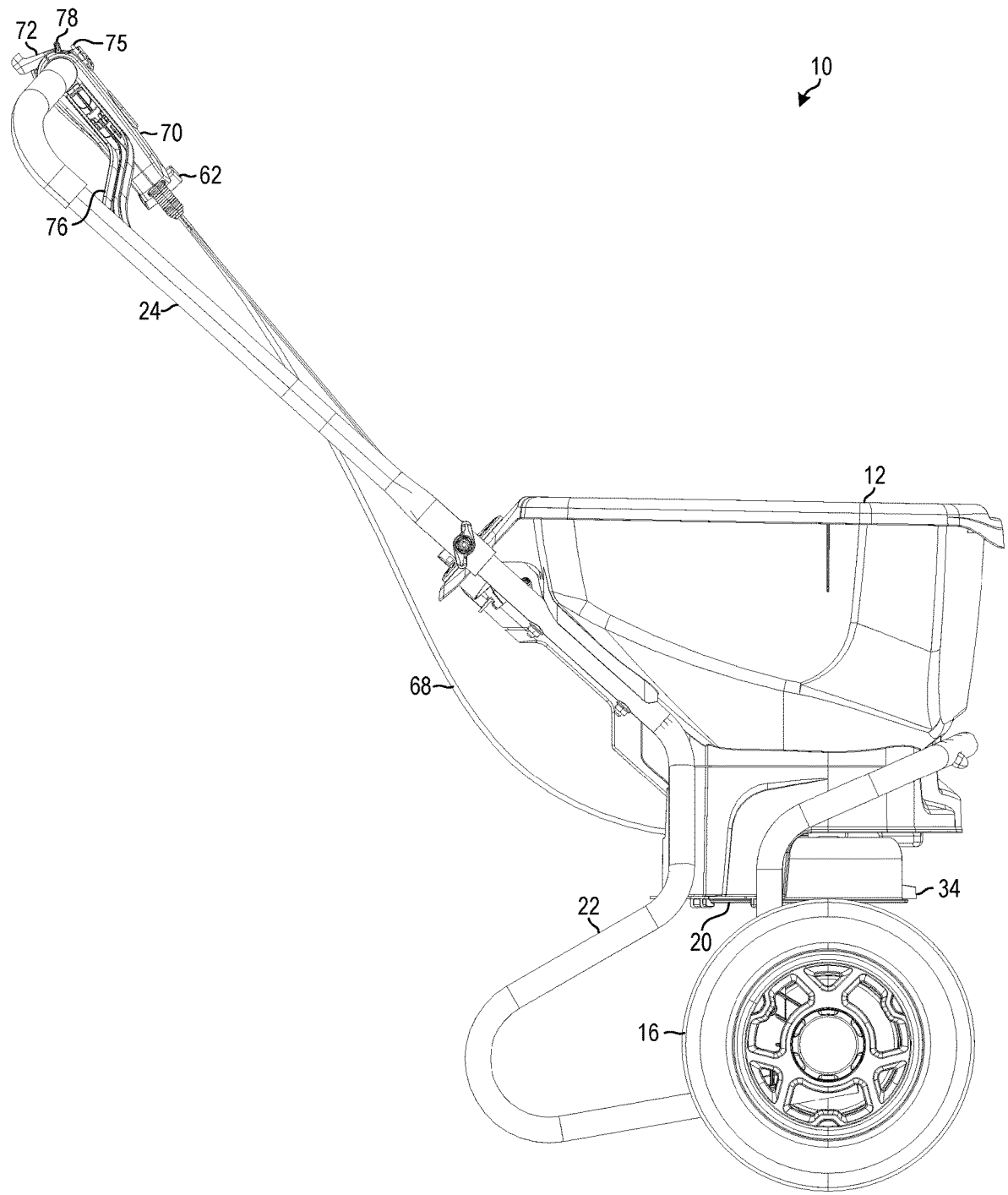
FIG. 27 is a left elevation view of various material deflecting components of the spreader illustratively shown in FIG. 22 in the engaged state.
Figure 28:
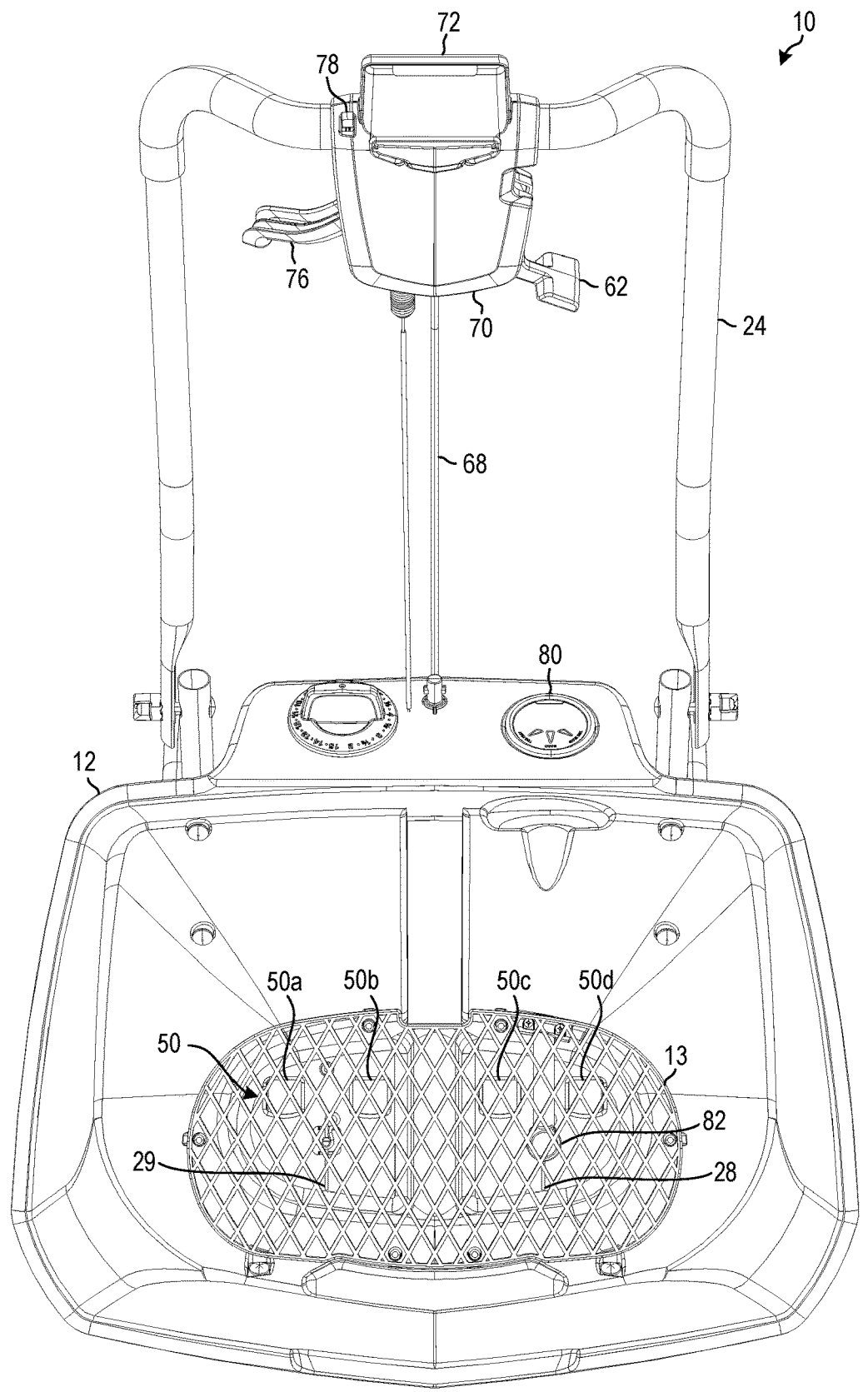
FIG. 28 is a top plan view of various material deflecting components of the spreader illustratively shown in FIG. 22 in the engaged state.
Figure 29:
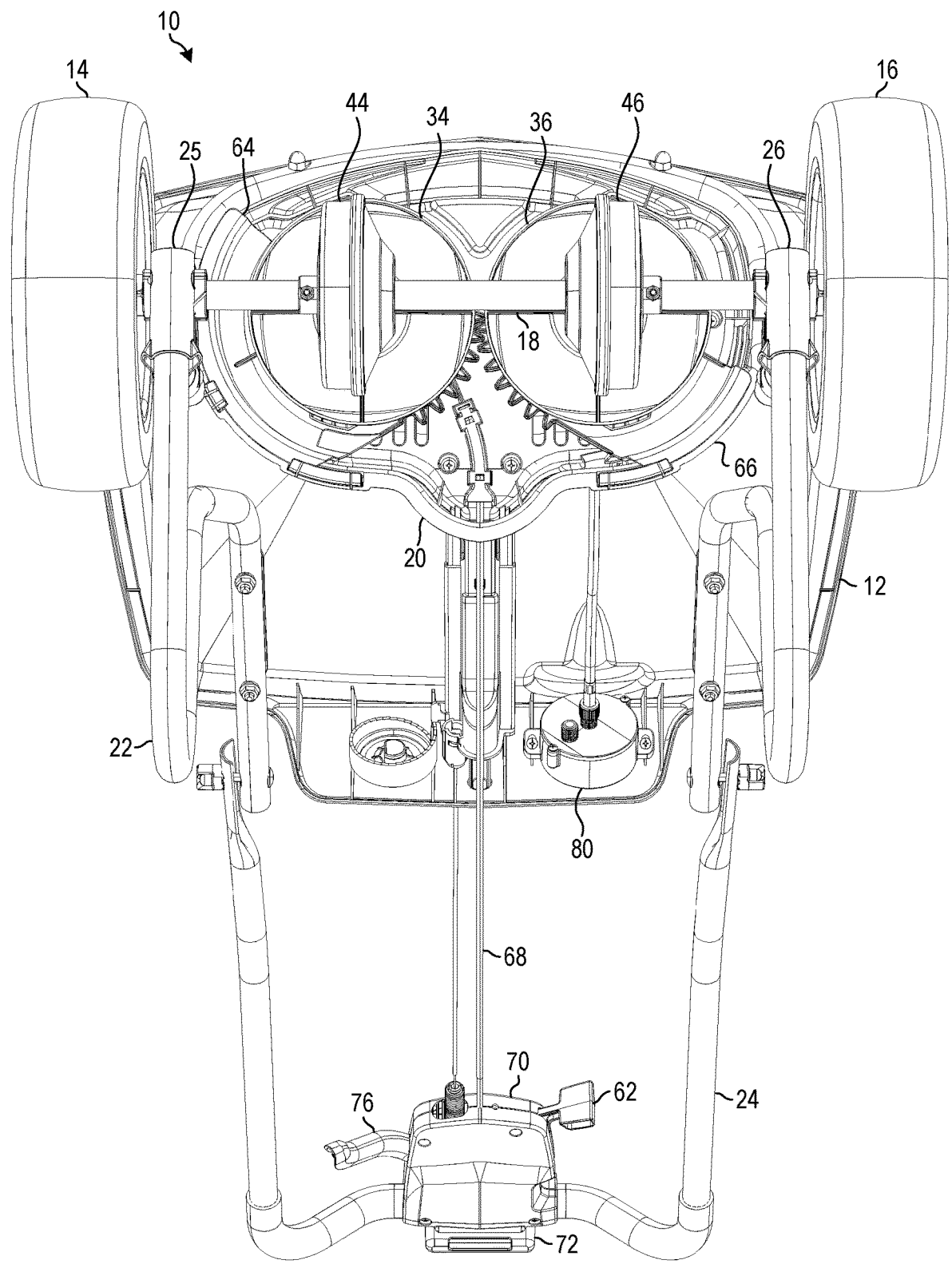
FIG. 29 is a bottom plan view of various material deflecting components of the spreader illustratively shown in FIG. 22 in the engaged state.

These and aspects of the illustrative embodiments will become apparent from the following detailed description, taken in conjunction with the accompanying drawings, illustrating by way of example the principles of the various illustrative embodiments.

DETAILED DESCRIPTION

The following text sets forth a broad description of numerous different embodiments involving a spreader system. The description is to be construed as illustrative only and does not describe every possible embodiment since describing every possible embodiment would be impractical, if not impossible, and it will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims.

It should also be understood that, unless a term is expressly defined in this specification using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). No term is intended to be essential unless so stated. To the extent that any term recited in the claims at the end of this patent is referred to in this patent in a manner consistent with a single meaning, that is done for sake of clarity only so as to not confuse the reader, and it is not intended that such a claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

According to some illustrative embodiments herein, the spreader may have a dual rotor configuration, a material deflection system, and/or a portable electronic device holder (e.g., a smart phone holder, a personal music player holder, a tablet holder, etc.). The material deflection system may include components for deflecting material broadcasted by one or each of the rotors. The spreader is configured to distribute granular material or product. The granular material may be contained in a hopper and may flow by gravity through one or more ports or openings to the rotors. In some embodiments, the spreader includes a walking speed indicator to inform the user whether the user's current speed is too fast, too slow, or correct (e.g., within an acceptable reference range). The correct speed may be configured in order to provide one or more of the spreader embodiments herein an improved and/or more controlled application rate of the product. In one or more embodiments herein, the spreader configurations may solve one or more various problems associated with the "left-to-right distribution pattern problem" associated with single rotor spreaders as well as may address coverage issues (e.g., lbs/sq ft) and/or application rate issues when users walk either too fast or too slow when using (e.g., pushing) the spreader.

As discussed herein, various embodiments are configured to distribute granular material or product. The term "granular product" or "granular material," as used throughout this description, refers to product that is particulate (or granular) in nature in that it is a dry (not liquid) product that is flowable. For example, granular product may include without limitation, ice melting granules, fertilizer, pesticides, herbicides, granular soil amendment material, granular oil absorbent material, dusting products, granular floor cleaning product, grass seed, or any other product that is dry and flowable.

Referring to FIGS. 1-21, an embodiment of a spreader 10 is shown. The illustrative spreader 10 includes a container or hopper 12 into which particulate or granular material such as fertilizer, pesticides, herbicides, seed and the like are placed by a user. In some embodiments, the hopper 12 may include a grate 13 or a grid disposed therein. In some embodiments, the grate 13 is fabricated from metal, but other materials are contemplated herein. The hopper 12 is mounted to a base assembly 20, which is mounted to a support frame 22. A tubular handle 24 is detachably connected to the support frame 22. The support frame 22 may include axel mounting brackets 25, 26, each including one or more axel clearance openings configured to be intersected by or contained by an axle 18. A pair of wheels or tires 14, 16 is connected by the axel 18. According to illustrative embodiments, the tires 14, 16 are constructed of polypropylene over foam rubber instead of being made of only plastic or rubber inflated with air. Hence, the tires 14, 16 may be referred to as a "never flat" tire. It should be appreciated that any other type of tire can be also be used. The support frame 22, base assembly 20, mounting brackets 25, 26, axle 18, and/or hopper 12 may comprise a variety of shapes, configurations, and materials. Illustrative materials may include, but not be limited to, metals, plastics, composites, combinations thereof, or the like.

Located beneath the hopper 12 are two rotors 34, 36, which are driven by a gear system 40 connected to the wheels 14, 16 of the spreader 10 via axle 18. The gear system 40 includes a separate gearbox 44, 46 for each rotor 34, 36, respectively. The rotors 34, 36 distribute the granular material that is deposited thereon from the hopper 12 when the spreader 10 is moving (and therefore the rotors are rotating). Each of the rotors 34, 36 may be connected to a different agitator 28, 29, respectively, by a shaft, rod, or cabling such that when the rotors 34, 36 rotate, the corresponding agitator 28, 29 rotates as well. The agitators 28, 29 may be positioned in the bottom portion of the hopper 12 and may be configured to facilitate transmission of the granular material in the hopper 12 through the openings 50 onto the respective rotors 34, 36.

The dual rotor configuration described herein provides improved distribution of granular material over single rotor configurations. In some illustrative embodiments, there may be two openings 50 disposed over each rotor 34, 36 for flow of granular material. For example, as illustratively shown in FIG. 12, the openings 50a, 50b, 50c, 50d are disposed within the hopper 12 such that the openings 50a, 50b are positioned over the rotor 34 and the openings 50c, 50d are positioned over the rotor 36. According to some illustrative embodiments, the openings 50 (e.g., 50a, 50b, 50c, 50d) may be substantially square in shape. In various embodiments, the openings 50 may be rectangular in shape. This shape provides an improved accuracy of the distribution of the material to the rotors 34, 36 and facilitates action of the material deflection system discussed herein. It should be appreciated that the openings 50 may also be formed in any other shape or configuration suitable for distributing the granular material to the rotors 34, 36. Various embodiments described herein may include a dual rotor system as described in U.S. Pat. No. 5,203,510. The contents of this application are hereby incorporated by reference in their entirety. The dual rotor system of U.S. Pat. No. 5,203,510 is constructed in a manner such that the discharge from each of the two individual impellers is controlled to achieve an additive distribution effect from each of the individual impellers resulting in a desired pattern of material distribution or coverage over a target area or treatment path or swath while avoiding undesirable skewing patterns and essentially eliminating centrally located coverage voids, thus addressing deficiencies of prior art dual rotor spreaders.

Figure 30:
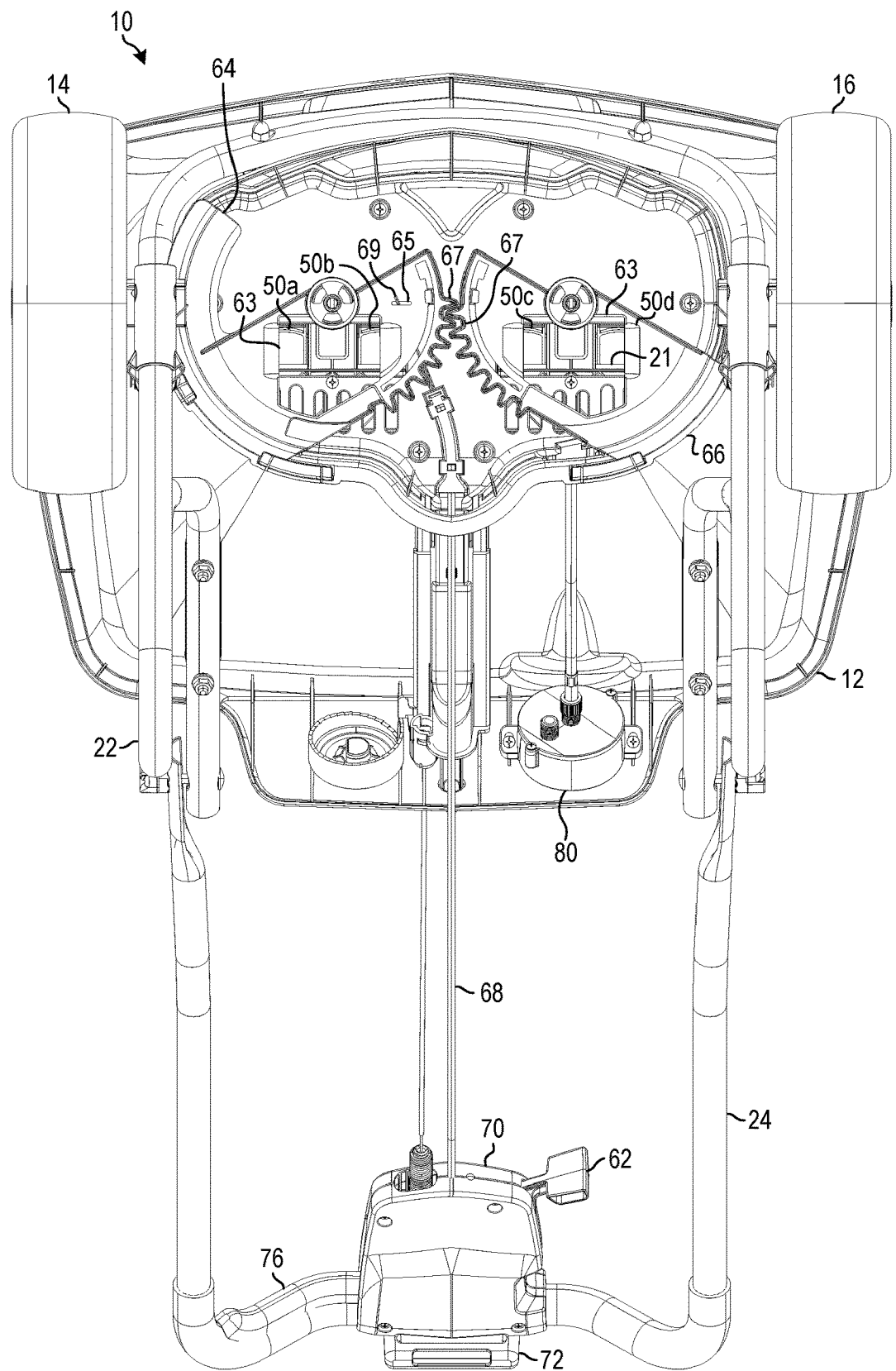
FIG. 30 is another bottom plan view of various material deflecting components of the spreader illustratively shown in FIG. 22 in the engaged state.
Figure 31:
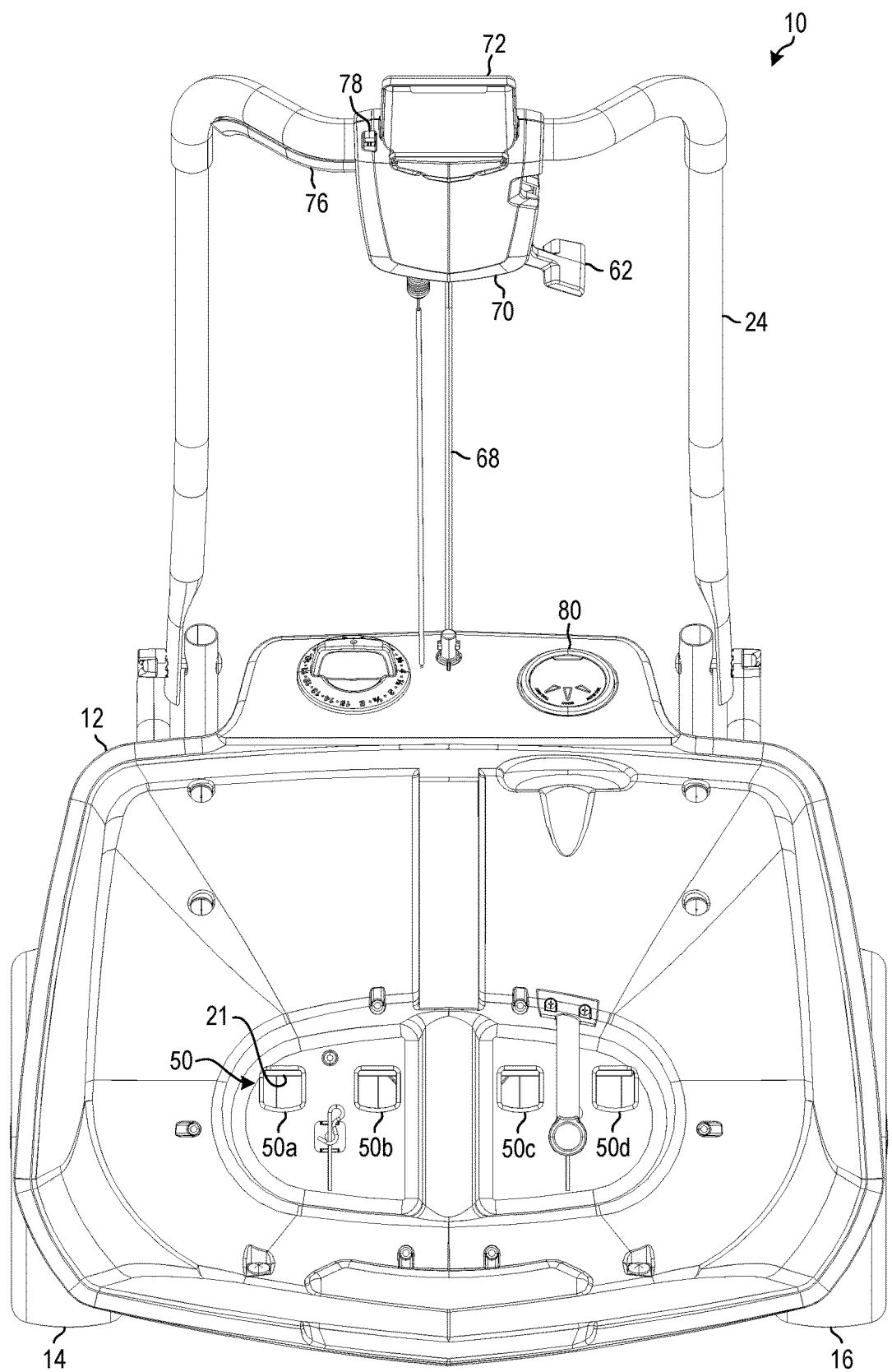
FIG. 31 is another top plan view of various material deflecting components of the spreader of FIG. 22 in the engaged state.

According to various embodiments, each rotor 34, 36 may have a material deflection system 60. The material deflection system 60 of the various embodiments may include Edge-Guard® technology. Such technology may prevent granular material or product from being thrown onto sidewalks, driveways, or other areas, as described in U.S. Pat. No. 6,616,074, which is hereby incorporated by reference in its entirety. The material deflection system 60 includes a pair of moveable deflectors 64, 66, one for each rotor 34, 36, respectively. As illustratively shown, the moveable deflectors 64, 66 include corresponding gear portions 67. The gear portions 67 of the moveable deflectors 64, 66 are configured such that rotation of the moveable deflector 64 in one direction (e.g., a clockwise direction when viewed from a bottom plan view of the spreader 10, FIG. 16) causes the moveable deflector 66 to rotate in the opposite direction (e.g., a counter-clockwise direction when viewed from a bottom plan view of the spreader 10, FIG. 16). As illustratively shown in FIGS. 16 and 18, the moveable deflector 64 is larger than the moveable deflector 66. That is, the moveable deflector 64 is configured to cover or block more of the rotor 34 than the amount of the rotor 36 blocked or covered by the moveable deflector 66. It should be appreciated, however, that the moveable deflectors 64, 66 may alternatively be configured to block or cover the same amount of the rotors 34, 36 or the moveable deflector 66 may be configured to block or cover more than the moveable deflector 64. Additionally, in some embodiments, either of the moveable deflectors 64, 66 may be configured not to block the corresponding rotor 34, 36 (see FIG. 19). In some embodiments, the moveable deflectors 64, 66 each include an aperture 63 sized and/or shaped to block a portion of the openings 50 of the hopper 12 when the material deflection system 60 is engaged or activated. For example, as illustratively shown in FIG. 30, when the material deflection system 60 is engaged, the apertures 63 of the moveable deflectors 64, 66 block a portion of each of the openings 50a, 50b and the openings 50c, 50d, respectively, of the hopper 12. It should be appreciated that the apertures 63 of the moveable deflectors 64, 66 may be sized or shaped to partially or completely block one or more of the openings 50 (e.g., openings 50a, 50b, 50c, and/or 50d) of the hopper 12 by any variety of amounts. For example, the apertures 60 of the moveable deflectors 64, 66 may be sized to block approximately half of the inner-most openings 50b, 50c and approximately three-quarters of the outer-most openings 50a, 50d. Of course, the apertures 60 of the moveable deflectors 64, 66 may be sized to block any amount and any combination of the openings 50, in other embodiments.

A user or consumer may engage or activate the material deflection system 60 via a deflection activation lever 62, which may form part of the control assembly 70 of the spreader 10. The deflection activation lever 62 may be connected to an end (not shown) of a deflection activation cable or wire 68. In some embodiments, the deflection activation wire 68 may be covered by a sheath or routed through a conduit. The other end 69 of the deflection activation wire 68 may be connected to an aperture 65 or opening of the moveable deflector 64 such that when the position of the deflection activation lever 62 is moved from a disengaged state (see FIGS. 1-8, 16, and 17) to an engaged state (see FIGS. 22-31), the deflection activation wire 68 is pulled towards the control assembly 70 and the moveable deflector 64 is rotated into an engaged position.

Figure 32:
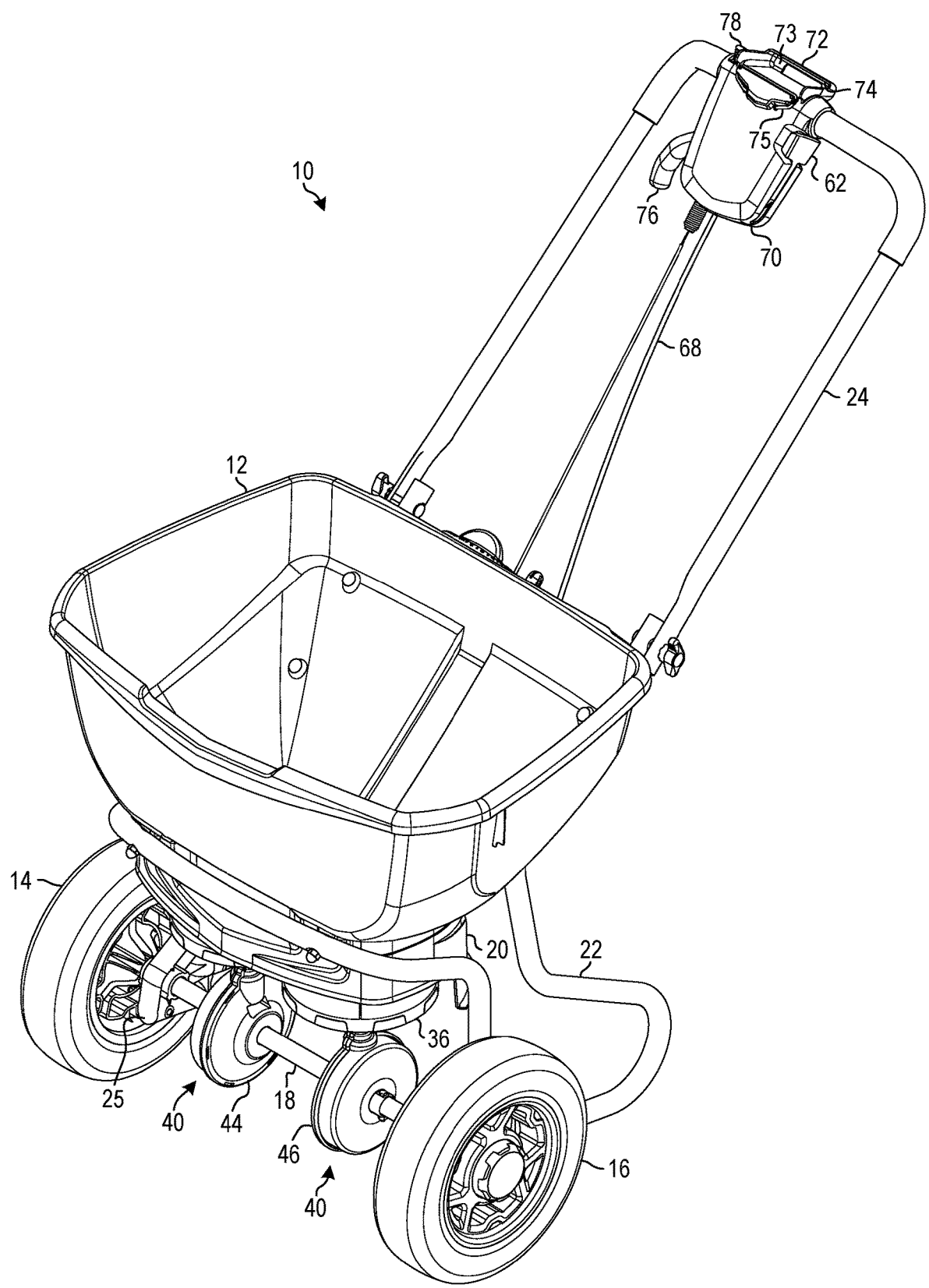
FIG. 32 is a perspective view of an embodiment of the spreader of FIG. 1 without a walking speed indicator.
Figure 33:
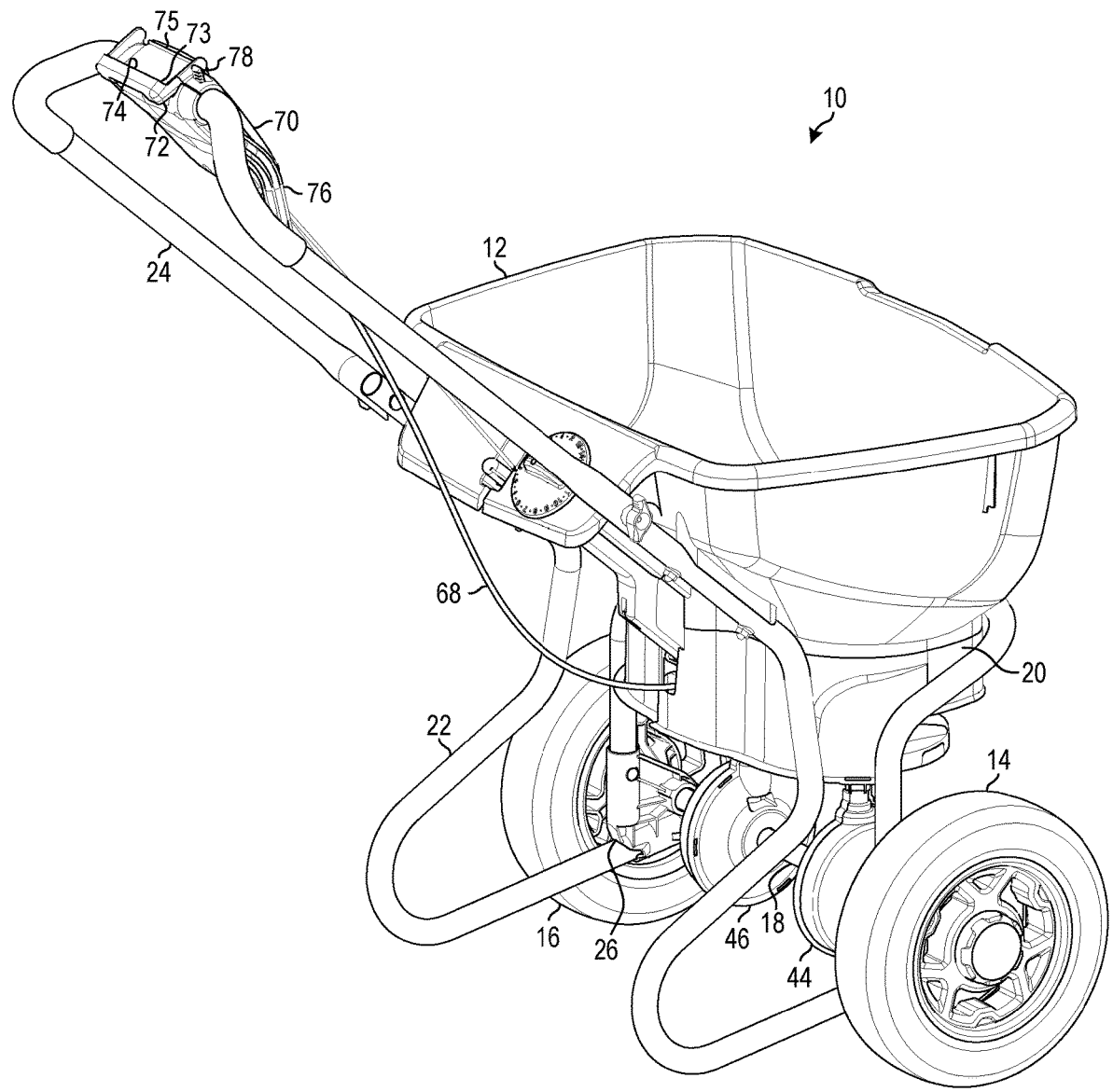
FIG. 33 is a rear perspective view of the embodiment of the spreader of FIG. 32.
Figure 34:
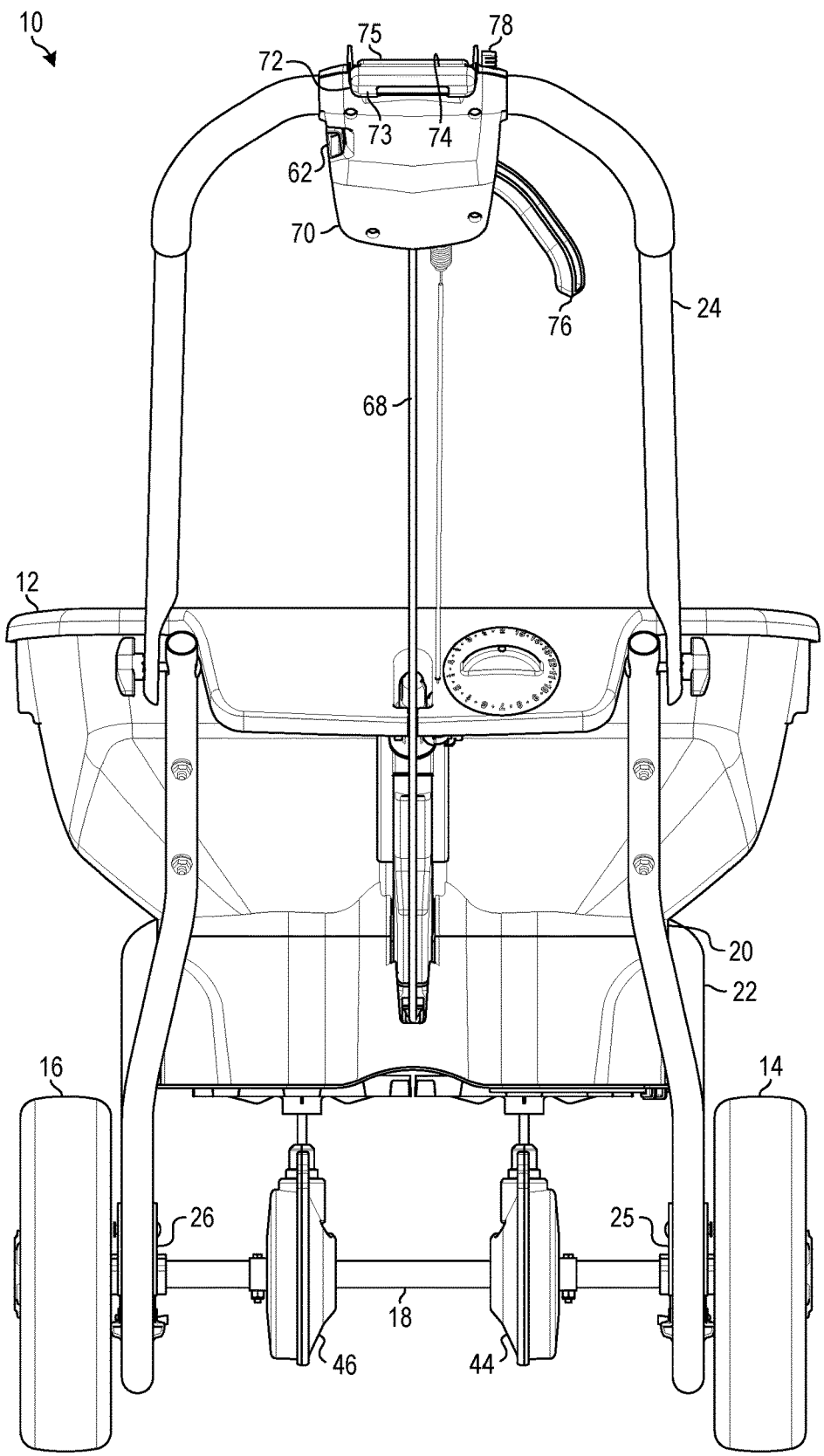
FIG. 34 is a rear elevation view of the embodiment of the spreader of FIG. 32.

Referring back to FIGS. 1-8, in some embodiments, the spreader 10 includes a walking speed indicator assembly 80. This indicator assembly 80 may receive inputs from a gear assembly 82 connected to the agitator 28 (see FIGS. 7 and 15). In other embodiments, the gear assembly 82 may instead be connected to the agitator 29. The gear assembly 82 transmits rotational movement of the agitator 28 to a stepper motor (not shown) via a wire or a shaft connected thereto. The stepper motor can be configured to generate an amount of current based on movement (e.g., velocity) of the spreader 10 by the user or the consumer. That is, when a consumer pushes or pulls the spreader 10, the wheels rotate, which drive the gear system 40 connected to the wheels 14, 16. The gear system 40 of the spreader 10, in turn, drive the rotors 34, 36 and the agitators 28, 29 thereby generating rotational movement from linear movement of the spreader 10. The rotational movement generated therefrom is transmitted to the stepper motor via the gear assembly 82 and connecting wire or shaft. The amount of rotational movement generated may be a function of the speed or rate at which the user is pushing or pulling the spreader 10. As such, the faster the user pushes or pulls the spreader 10, the more current can be generated by the stepper motor. It should be appreciated that, in some embodiments, the spreader 10 may not include the walking speed indicator assembly 80. For example, FIGS. 32-34 depict an illustrative embodiment of the spreader 10 without the walking speed indicator assembly 80.

The stepper motor can be communicatively coupled to an integrated logic circuit (not shown). The integrated logic circuit can be configured to determine or measure the amount of current generated by the stepper motor. Thereafter, in some embodiments, the integrated logic circuit is configured to compare the determined amount of current to a predetermined or reference amount of current that corresponds to an ideal or preferred linear speed of the spreader 10 (e.g., 2.75 miles per hour or 4 ft/sec). Based on that comparison, the integrated logic circuit is configured to activate one or more indicator lights of the walking speed indicator assembly 80 to indicate to the user whether the current speed is too fast, too slow, or within an acceptable reference range. In certain embodiments, the speed setting may be varied based on the spreader setting for distribution of the material. The integrated logic circuit can be configured to continuously and/or continually determine the amount of current generated by the stepper motor and inform the user whether the current speed is too fast, too slow, or within the acceptable reference range.

In some embodiments, the walking speed indicator assembly 80 includes three light emitting diodes (LEDs) 84, 86, 88. In such embodiments, the LED 84 may be a red LED to represent that the current speed is too slow, the LED 86 may be a green LED to represent that the current speed is ideal, and the LED 88 may be another red LED to represent that the current speed is too fast. It should be appreciated that no separate power source is required since the integrated logic circuit and the indicator lights 84, 86, 88 are powered by current generated by the stepper motor. It should be further appreciated that the walking speed indicator assembly 80 can include additional or other types of indicators (e.g., display screens, speakers, tactile generation devices, etc.), in other embodiments. For example, the speed indicator assembly 80 may also determine and/or indicate the actual speed (e.g., feet/second) of the spreader and/or include indicia to indicate to a user that the actual speed is either within the desired speed range or outside the desired speed range. It should also be appreciated that although a stepper motor is described in the illustrative embodiment as generating the current, any other type of device or mechanism for generating the current and/or measuring the speed of the spreader 10 can be used.

The control assembly 70 may include a holder 72 for holding a portable electronic device (e.g., a smart phone, a personal music player, a tablet, a PDA, etc.). The holder 72 can include a lip 73 and/or a base surface 74 configured to retain at least a portion of the portable electronic device. In some embodiments, the holder 72 also includes a securing mechanism 75 (e.g., an elastic band, a hook and loop strap, a tether, a clip, etc.) for securing at least a portion of the portable electronic device to the holder 72.

The control assembly 70 also may include a distribution lever 76 (or similar mechanism) for controlling distribution of the granular material from the spreader 10. For example, as shown in the illustrative embodiment, the distribution lever 76 can be connected to a plate or shutter 21 of the base assembly 20 via a spring, a wire, a cable, or any combination thereof. A user or consumer may engage or activate the distribution lever 76, which causes the shutter 21 to slide towards the rear portion of the base assembly 20, thereby exposing the openings 50 of the hopper 12. That is, movement of the shutter 21 towards the rear portion unblocks the openings 50 of the hopper 12 (e.g., partially or completely opening one or more of the openings 50), which thereby allows the granular material in the hopper 12 to pass through to the rotors 34, 36 for distribution. It should be appreciated that the user can fully or partially engage the distribution lever 76. In doing so, the user can control how much of the openings 50 are exposed and thereby control the flow rate (e.g., throttle) of the granular material from the hopper 12 to the rotors 34, 36. In some embodiments, the control assembly 70 includes a locking mechanism 78. The locking mechanism 78 is configured to lock or secure the distribution lever 76 in an engaged state. It should be appreciated that the shutter 21 can be in any shape or configuration suitable for exposing and covering the openings 50 of the hopper 12 (see FIGS. 20-21). In some embodiments, such as the one illustratively shown in FIG. 14, the control assembly 20 of the spreader 10 may include a lock guard 79 or any other suitable structure for protecting the lock 78 from damage when the handle 24 is in a folded position.

It should be understood that any feature and/or element of any one of the embodiments and/or examples shown and described above herein may be removed from the embodiment and/or example, replaced with a feature or element from another embodiment or example herein or replaced with an equivalent feature or element.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any embodiment disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made. It is therefore intended to cover in the appended claims all such changes and modifications.

The invention claimed is:

1. A spreader, comprising:
a frame;
a hopper connected to the frame and configured to contain granular material to be spread over terrain or other surfaces;
two wheels rotatably connected to the frame;
a first rotor and a second rotor rotatably connected to the frame below the hopper and configured to spread the granular material, wherein the first and second rotors rotate in opposite directions and independently of each other;
a gear system constructed to drive the first and second rotors, the gear system receiving input from at least one wheel of the two wheels;
two square openings disposed in the lower portion of the hopper such that each of the two openings is located over a different one of the first and second rotors, each opening being configured to allow the flow of granular material, by gravity, from the hopper onto the different one of the first and second rotors;
a first agitator connected to the first rotor and configured to facilitate the flow of the granular material from the hopper onto the first rotor;
a second agitator connected to the second rotor and configured to facilitate the flow of the granular material from the hopper onto the second rotor;
a gear assembly connected to one of the first agitator or the second agitator;
a stepper motor connected to the gear assembly and configured to generate an amount of current as a function of rotational movement received from the gear assembly; and
an integrated logic circuit communicatively coupled to the stepper motor, the integrated logic circuit configured to: (i) measure the amount of current generated by the stepper motor, (ii) compare the measured amount of current to a reference amount of current, and (iii) determine, based on the results of the comparison, feedback to provide to a user regarding a linear velocity of spreader.

2. The spreader of claim 1, further comprising an indicator, located so as to be visible to the user that provides the feedback.

3. The spreader of claim 2, wherein the indicator comprising three lights, the three lights each indicate the linear velocity of the spreader relative to a predetermined linear velocity.

4. The spreader of claim 3, wherein the three lights comprise red, green, and red lights.

5. The spreader of claim 2, wherein the feedback comprises an indication that the linear velocity of the spreader is too fast, too slow, or within a reference acceptable range.

6. The spreader of claim 1, further comprising a holder for holding a portable electronic device, the holder being located such that it is accessible to the user while using the spreader.

7. The spreader of claim 1, wherein the wheels are made of a foam rubber material.

8. The spreader of claim 1, wherein the granular material comprises any of ice melting granules, fertilizer, pesticides, herbicides, granular soil amendment material, granular oil absorbent material, dusting products, granular floor cleaning product, or grass seed.

9. The spreader of claim 1, further comprising two additional square openings disposed in the lower portion of the hopper such that each of the two additional square openings is located over a different one of the first and second rotors, each additional square opening being configured to allow the flow of granular material, by gravity, from the hopper onto the different one of the first and second rotors.

10. The spreader of claim 1, further comprising a first moveable deflector and a second moveable deflector configured to block at least a portion of the granular material ejected by the first and second rotors, the first moveable deflector rotates in a first direction and is configured to block at least a portion of the first rotor when activated, the second moveable deflector rotates in a second direction and is configured to block at least a portion of the second rotor when activated.

11. A spreader, comprising:
a frame;
a hopper connected to the frame and configured to contain granular material to be spread over terrain or other surfaces;
two wheels rotatably connected to the frame;
a first rotor and a second rotor, wherein the first and second rotors are rotatably connected to the frame below the hopper and configured to spread the granular material, and wherein the first and second rotors rotate in opposite directions and independently of each other;
a gear system constructed to drive the first and second rotors, the gear system receiving input from at least one wheel of the two wheels;
a first opening disposed in the lower portion of the hopper, wherein the first opening is located over the first rotor and is configured to allow the flow of granular material, by gravity, from the hopper onto the first rotor;
a second opening disposed in the lower portion of the hopper, wherein the second opening is located over the second rotor and is configured to allow the flow of granular material, by gravity, from the hopper onto the second rotor;
a first moveable deflector configured to rotate in a first direction and block at least a portion of the granular material ejected by the first rotor when activated, the first moveable deflector comprises a first gear portion; and
a second moveable deflector configured to rotate in a second direction and block at least a portion of the granular material ejected by the second rotor when activated, the second moveable deflector comprises a second gear portion configured to engage with the first gear portion of the first moveable deflector such that rotation of first moveable deflector in the first direction causes the second moveable deflector to rotate in the second direction.

12. The spreader of claim 11, wherein the first opening and the second opening are substantially square in shape.

13. The spreader of claim 11, further comprising:
a third opening disposed in the lower portion of the hopper adjacent to the first opening, wherein the third opening is located over the first rotor and is configured to allow the flow of granular material, by gravity, from the hopper onto the first rotor; and
a fourth opening disposed in the lower portion of the hopper adjacent to the second opening, wherein the fourth opening is located over the second rotor and is configured to allow the flow of granular material, by gravity, from the hopper onto the second rotor.

14. The spreader of claim 11, further comprising a holder for holding a portable electronic device, the holder being located such that it is accessible to the user while using the spreader.

15. The spreader of claim 11, wherein the wheels are made of a foam rubber material.

16. The spreader of claim 11, wherein the granular material comprises any of ice melting granules, fertilizer, pesticides, herbicides, granular soil amendment material, granular oil absorbent material, dusting products, granular floor cleaning product, or grass seed.

17. The spreader of claim 11, wherein the first moveable deflector and the second moveable deflector are moveable between at least a first position and a second position.

18. The spreader of claim 11, wherein the first moveable deflector blocks at least a portion of the first rotor when activated and the second moveable deflector blocks at least a portion of the second rotor when activated.

19. The spreader of claim 18, wherein the portion of the first rotor blocked by the first moveable deflector is larger than the portion of the second rotor blocked by the second moveable deflector.

20. The spreader of claim 11, further comprising a deflection activation lever connected to the first moveable deflector, the deflection activation lever configured for selective activation of the first and second moveable deflectors.

21. The spreader of claim 10, wherein the first moveable deflector comprises a first gear portion and the second moveable deflector comprises a second gear portion, the first gear portion is configured to engage with the second gear portion such that rotation of the first moveable deflector causes the second moveable deflector to rotate in the second direction.

* * * * *